United States Patent
Johns et al.

(10) Patent No.: US 7,747,407 B2
(45) Date of Patent: *Jun. 29, 2010

(54) THERMAL INTERRUPT GENERATION

(75) Inventors: Charles Ray Johns, Austin, TX (US); Michael Fan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/337,034

(22) Filed: Dec. 17, 2008

(65) Prior Publication Data

US 2009/0099806 A1    Apr. 16, 2009

Related U.S. Application Data

(63) Continuation of application No. 11/425,459, filed on Jun. 21, 2006, now Pat. No. 7,480,586.

(51) Int. Cl.
*G01K 1/00* (2006.01)
*G06F 1/00* (2006.01)

(52) U.S. Cl. .................................... 702/130
(58) Field of Classification Search ............... 702/130, 702/132; 700/299, 300; 374/100
See application file for complete search history.

(56) References Cited

U.S. PATENT DOCUMENTS

| | | |
|---|---|---|
| 5,175,852 A | 12/1992 | Johnson et al. |
| 5,469,560 A | 11/1995 | Beglin |
| 5,590,061 A | 12/1996 | Hollowell, II et al. |
| 5,778,384 A | 7/1998 | Provino et al. |
| 5,953,536 A | 9/1999 | Nowlin, Jr. |
| 6,029,119 A | 2/2000 | Atkinson |
| 6,535,798 B1 | 3/2003 | Bhatia et al. |
| 6,564,328 B1 | 5/2003 | Grochowski et al. |
| 6,654,894 B2 | 11/2003 | Kaminski et al. |
| 6,776,817 B2 | 8/2004 | Lentz et al. |

(Continued)

FOREIGN PATENT DOCUMENTS

EP    1182538 A2    2/2002

(Continued)

OTHER PUBLICATIONS

Smith, "Measuring Temperatures on Computer Chips with Speed and Accuracy", Analog Dialogue 33-4, (1999 Analog Devices), pp. 1-5.

(Continued)

*Primary Examiner*—Michael P. Nghiem
*Assistant Examiner*—Cindy H Khuu
(74) *Attorney, Agent, or Firm*—Matthew B. Talpis; Gregory K Goshorn; Greg Goshorn, P.C.

(57) ABSTRACT

A computer implemented method, data processing system, and processor are provided for thermal interrupt generation. An interrupt temperature is set to a first temperature and an interrupt direction is to a greater than or equal to determination. A determination is made as to whether a sensed temperature from a digital thermal sensor meets or exceeds the interrupt temperature in response to the interrupt direction. A first interrupt is generated in response to the sensed temperature meeting or exceeding the interrupt temperature.

20 Claims, 10 Drawing Sheets

U.S. PATENT DOCUMENTS

| | | | |
|---|---|---|---|
| 7,149,645 | B2 | 12/2006 | Mangrulkar et al. |
| 7,197,433 | B2 | 3/2007 | Patel et al. |
| 7,228,508 | B1 | 6/2007 | Pippin |
| 7,263,567 | B1 | 8/2007 | Subramaniyam et al. |
| 7,275,012 | B2 | 9/2007 | Hermerding, II |
| 7,386,414 | B2 | 6/2008 | Aguilar, Jr. et al. |
| 7,399,211 | B1 | 7/2008 | Spaulding |
| 7,447,920 | B2 | 11/2008 | Sharma et al. |
| 7,587,262 | B1* | 9/2009 | Pippin ................ 700/299 |
| 7,596,430 | B2* | 9/2009 | Aguilar et al. .......... 700/299 |
| 2002/0065049 | A1 | 5/2002 | Chauvel et al. |
| 2002/0104030 | A1 | 8/2002 | Ahn |
| 2003/0110012 | A1 | 6/2003 | Orenstien et al. |
| 2003/0117759 | A1 | 6/2003 | Cooper |
| 2003/0158697 | A1 | 8/2003 | Gold et al. |
| 2003/0177107 | A1 | 9/2003 | Brown et al. |
| 2003/0229662 | A1 | 12/2003 | Luick |
| 2004/0035851 | A1* | 2/2004 | Antoniou et al. ......... 219/509 |
| 2004/0047099 | A1* | 3/2004 | Pippin ................ 361/103 |
| 2004/0128101 | A1 | 7/2004 | Hermerding, II |
| 2004/0204899 | A1* | 10/2004 | Gunther et al. ......... 702/132 |
| 2005/0005083 | A1 | 1/2005 | Ozdemir et al. |
| 2005/0216222 | A1 | 9/2005 | Inoue |
| 2005/0216775 | A1 | 9/2005 | Inoue |
| 2005/0228618 | A1 | 10/2005 | Patel et al. |
| 2005/0246558 | A1 | 11/2005 | Ku |
| 2005/0278520 | A1 | 12/2005 | Hirai et al. |
| 2006/0041766 | A1 | 2/2006 | Adachi |
| 2006/0047808 | A1 | 3/2006 | Sharma et al. |
| 2006/0101289 | A1 | 5/2006 | Dang et al. |
| 2007/0074011 | A1 | 3/2007 | Borkar et al. |
| 2007/0106428 | A1* | 5/2007 | Omizo et al. ............ 700/300 |
| 2007/0121698 | A1 | 5/2007 | Johns et al. |
| 2007/0121699 | A1 | 5/2007 | Johns et al. |
| 2007/0124101 | A1 | 5/2007 | Aguilar, Jr. et al. |
| 2007/0124102 | A1 | 5/2007 | Aguilar, Jr. et al. |
| 2007/0124103 | A1 | 5/2007 | Aguilar, Jr. et al. |
| 2007/0124104 | A1 | 5/2007 | Johns et al. |
| 2007/0124105 | A1 | 5/2007 | Johns et al. |
| 2007/0124355 | A1 | 5/2007 | Johns et al. |
| 2007/0124611 | A1 | 5/2007 | Johns et al. |
| 2007/0124618 | A1 | 5/2007 | Aguilar, Jr. et al. |
| 2007/0124622 | A1 | 5/2007 | Johns et al. |
| 2007/0198134 | A1 | 8/2007 | Adachi et al. |
| 2007/0260415 | A1 | 11/2007 | Aguilar, Jr. et al. |
| 2007/0260893 | A1 | 11/2007 | Aguilar, Jr. et al. |
| 2007/0260894 | A1 | 11/2007 | Aguilar, Jr. et al. |
| 2007/0260895 | A1 | 11/2007 | Aguilar, Jr. et al. |

FOREIGN PATENT DOCUMENTS

| | | |
|---|---|---|
| EP | 1783608 A1 | 5/2007 |
| WO | 2005093564 A2 | 10/2005 |
| WO | 2005124550 A1 | 12/2005 |

OTHER PUBLICATIONS http://www.m-w.com/dictionary/sense, pp. 1-2, retrieved Dec. 11, 2006.

http://en.wikipedia.org/wiki/Central_processing_unit, pp. 1-13, retrieved Dec. 26, 2006.

\* cited by examiner

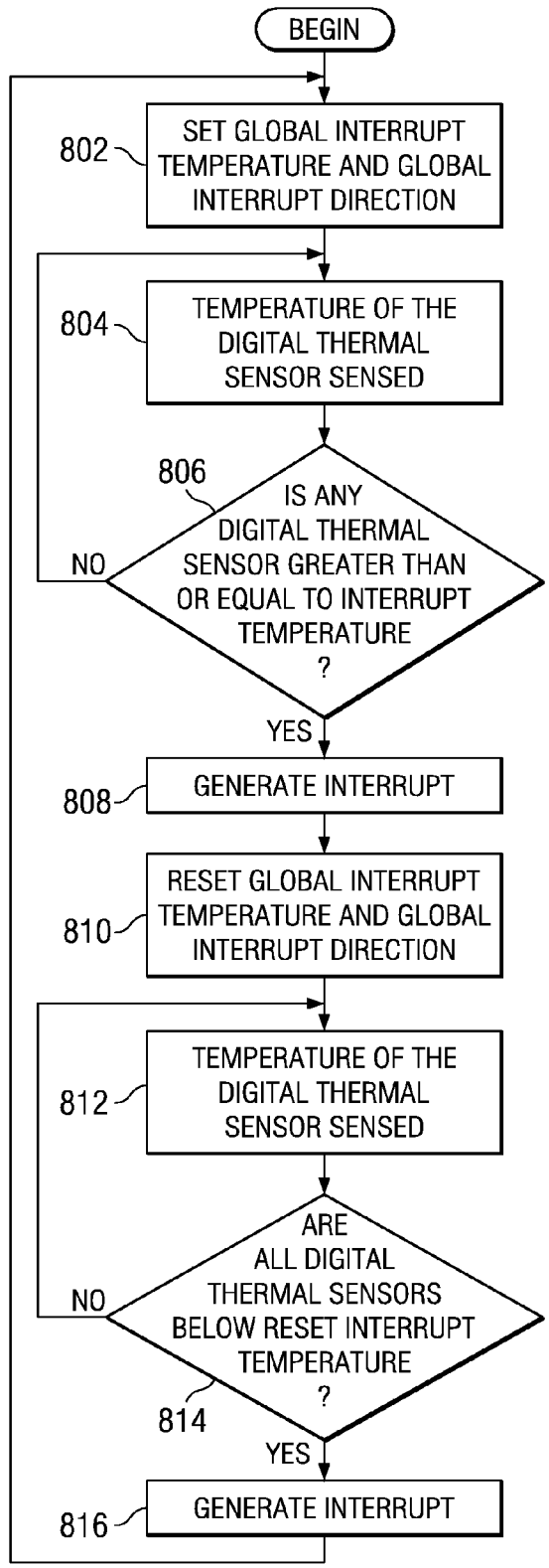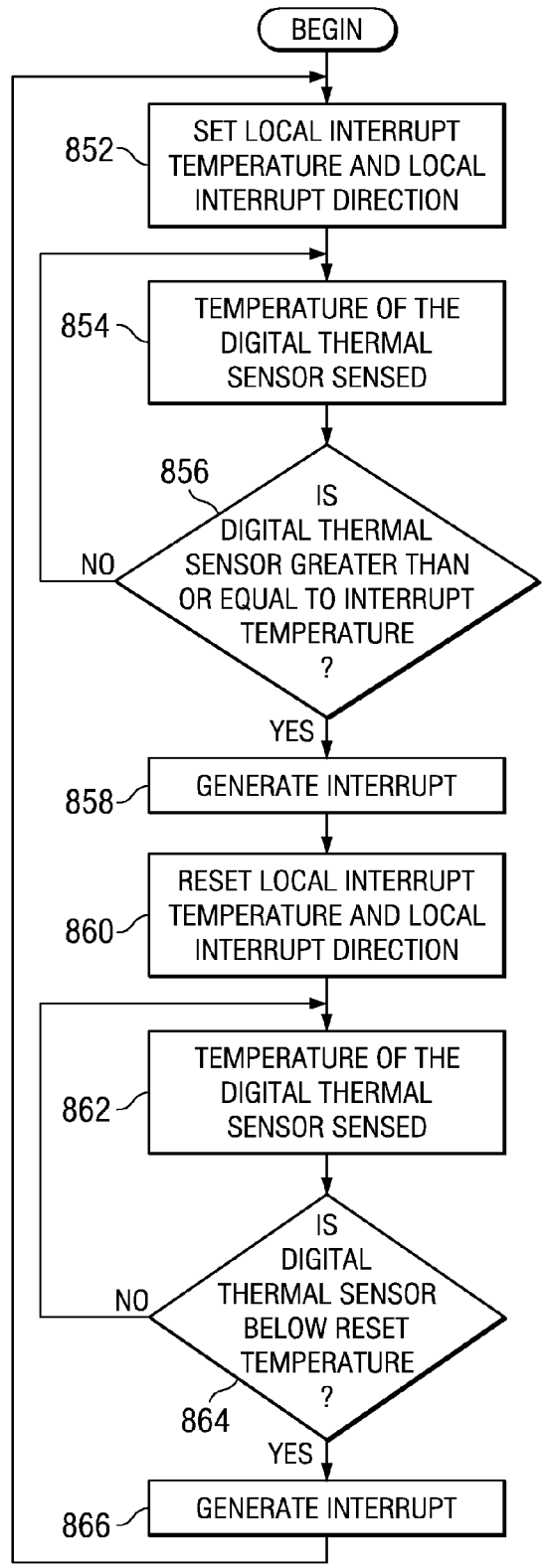

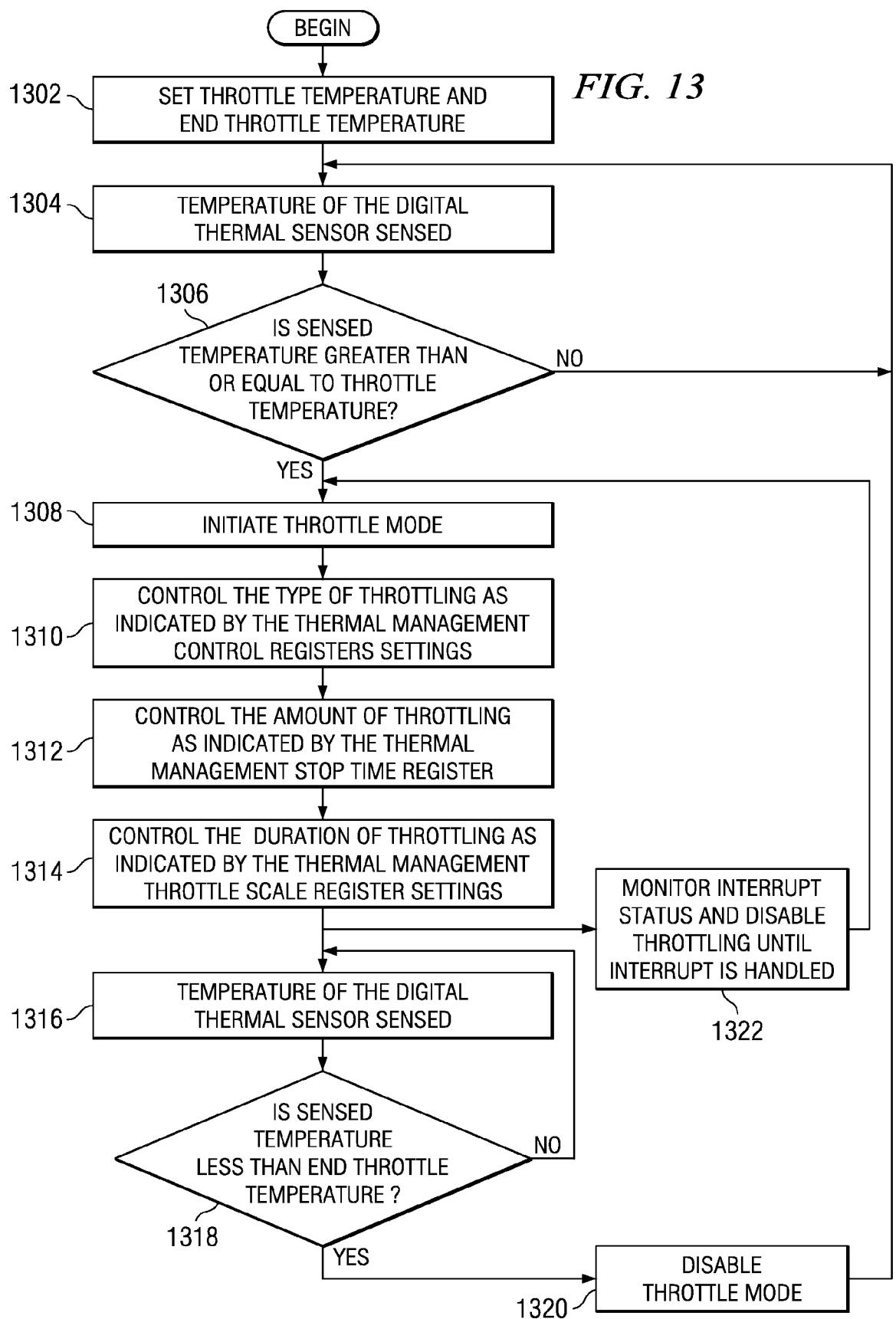

THERMAL INTERRUPT GENERATION

This application is a continuation application, and claims the benefit of the filing date, of U.S. patent application Ser. No. 11/425,459, now U.S. Pat. No. 7,480,586, filed Jun. 21, 2006.

BACKGROUND

1. Field of the Invention

The present application relates generally to use of thermal management. Still more particularly, the present application relates to a computer implemented method, data processing system, and processor for thermal interrupt generation.

2. Description of the Related Art

The first-generation heterogeneous Cell Broadband Engine™ (BE) processor is a multi-core chip comprised of a 64-bit Power PC® processor core and eight single instruction multiple data (SIMD) synergistic processor cores, capable of massive floating point processing, optimized for compute-intensive workloads and broadband rich media applications. A high-speed memory controller and high-bandwidth bus interface are also integrated on-chip. Cell BE's breakthrough multi-core architecture and ultra high-speed communications capabilities deliver vastly improved, real-time response, in many cases ten times the performance of the latest PC processors. Cell BE is operating system neutral and supports multiple operating systems simultaneously. Applications for this type of processor range from a next generation of game systems with dramatically enhanced realism, to systems that form the hub for digital media and streaming content in the home, to systems used to develop and distribute digital content, and to systems to accelerate visualization and supercomputing applications.

Today's multi-core processors are frequently limited by thermal considerations. Typical solutions include cooling and power management. Cooling may be expensive and/or difficult to package. Power management is generally a coarse action, "throttling" much if not all of the processor in reaction to a thermal limit being reached. Other techniques such as thermal management help address these coarse actions by only throttling the units exceeding a given temperature. However, most thermal management techniques impact the real-time guarantees of an application. Therefore, it would be beneficial to provide a thermal management solution which provides a processor with a method to guarantee the real-time nature of an application even in the event of a thermal condition which requires throttling of the processor. In the cases where the real-time guarantees can not be met, the application administrator is notified so that a corrective action can be implemented.

SUMMARY

The different aspects of the illustrative embodiments provide a computer implemented method, data processing system, and processor for thermal interrupt generation. The illustrative embodiments set an interrupt temperature to a first temperature and set an interrupt direction to a greater than or equal to determination. Responsive to the interrupt direction, the illustrative embodiments determine if a sensed temperature from a digital thermal sensor meets or exceeds the interrupt temperature. Responsive to the sensed temperature meeting or exceeding the interrupt temperature, the illustrative embodiments generate a first interrupt.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

FIGS. 8A and 8B depict flow diagrams of the operation for advanced thermal interrupt generation in accordance with an additional illustrative embodiment;

FIG. 13 depicts a flow diagram of the operation of an implementation of thermal throttling logic in accordance with an additional illustrative embodiment.

DETAILED DESCRIPTION OF THE PREFERRED EMBODIMENT

Figure 1:
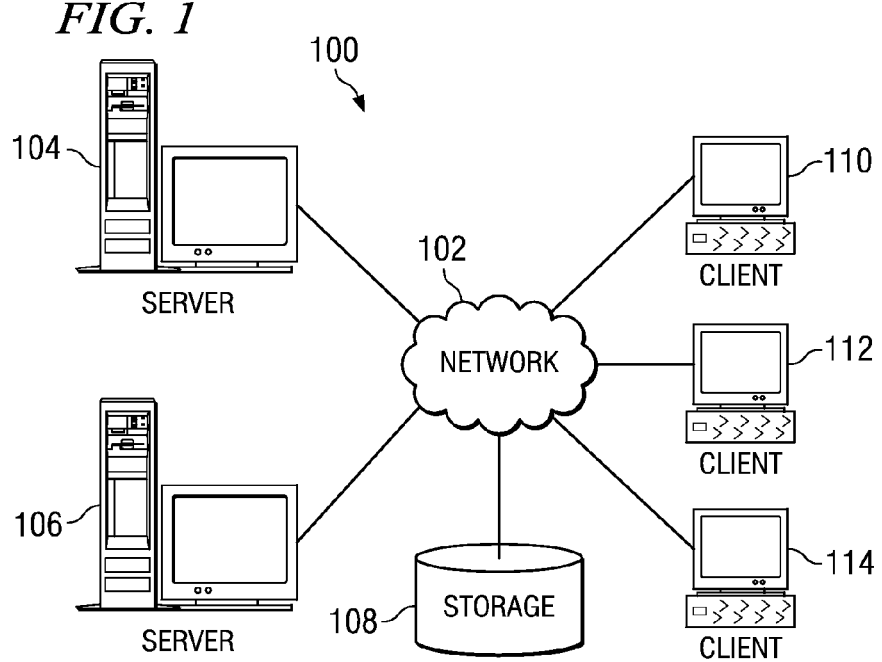
FIG. 1 depicts a pictorial representation of a network of data processing systems in which aspects of the illustrative embodiments may be implemented.
Figure 2:
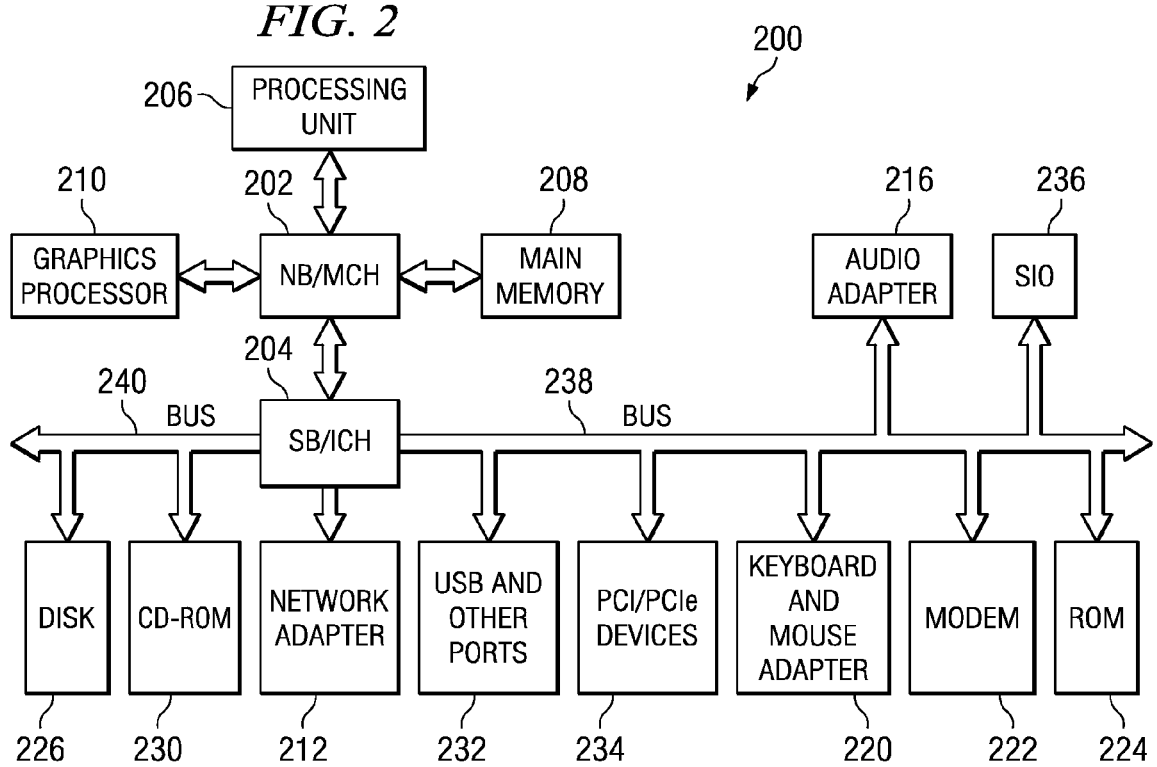
FIG. 2 depicts a block diagram of a data processing system is shown in which aspects of the illustrative embodiments may be implemented.

The illustrative embodiments relate to thermal interrupt generation. FIGS. 1-2 are provided as exemplary diagrams of data processing environments in which the illustrative embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope of the illustrative embodiments.

With reference now to the figures, FIG. 1 depicts a pictorial representation of a network of data processing systems in which aspects of the illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different illustrative embodiments.

With reference now to FIG. 2, a block diagram of a data processing system is shown in which aspects of the illustrative embodiments may be implemented. Data processing system 200 is an example of a computer, such as server 104 or client 110 in FIG. 1, in which computer usable code or instructions implementing the processes for illustrative embodiments may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, LAN adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for the illustrative embodiments are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
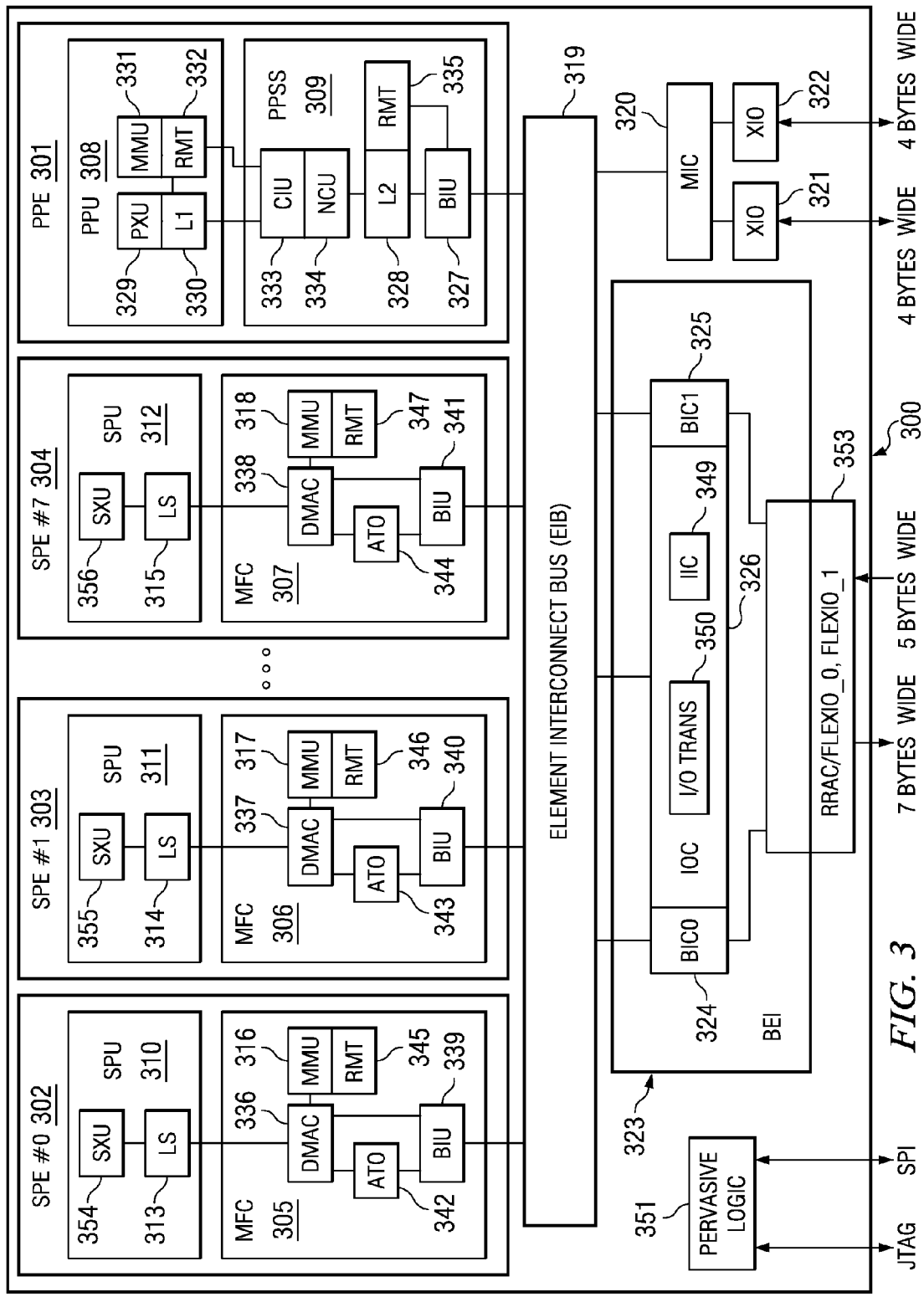
FIG. 3 depicts an exemplary diagram of a Cell BE chip in which aspects of the illustrative embodiments may be implemented.

FIG. 3 depicts an exemplary diagram of a Cell BE chip in which aspects of the illustrative embodiments may be implemented. Cell BE chip 300 is a single-chip multiprocessor implementation directed toward distributed processing targeted for media-rich applications such as game consoles, desktop systems, and servers.

Cell BE chip 300 may be logically separated into the following functional components: Power PC® processor element (PPE) 301, synergistic processor units (SPUs) 310, 311, and 312, and memory flow controllers (MFCs) 305, 306, and 307. Although synergistic processor elements (SPEs) 302, 303, and 304 and PPE 301 are shown by example, any type of processor element may be supported. Exemplary Cell BE chip 300 implementation includes one PPE 301 and eight SPEs, although FIG. 3 shows only three SPEs 302, 303, and 304. The SPE of a CELL Processor is a first implementation of a new processor architecture designed to accelerate media and data streaming workloads.

Cell BE chip 300 may be a system-on-a-chip such that each of the elements depicted in FIG. 3 may be provided on a single microprocessor chip. Moreover, Cell BE chip 300 is a heterogeneous processing environment in which each of SPUs 310, 311, and 312 may receive different instructions from each of the other SPUs in the system. Moreover, the instruction set for SPUs 310, 311, and 312 is different from that of Power PC® processor unit (PPU) 308, e.g., PPU 308 may execute Reduced Instruction Set Computer (RISC) based instructions in the Power™ architecture while SPUs 310, 311, and 312 execute vectorized instructions.

Each SPE includes one SPU 310, 311, or 312 with its own local store (LS) area 313, 314, or 315 and a dedicated MFC 305, 306, or 307 that has an associated memory management unit (MMU) 316, 317, or 318 to hold and process memory protection and access permission information. Once again, although SPUs are shown by example, any type of processor unit may be supported. Additionally, Cell BE chip 300 implements element interconnect bus (EIB) 319 and other I/O structures to facilitate on-chip and external data flow.

EIB 319 serves as the primary on-chip bus for PPE 301 and SPEs 302, 303, and 304. In addition, EIB 319 interfaces to other on-chip interface controllers that are dedicated to off-chip accesses. The on-chip interface controllers include the memory interface controller (MIC) 320, which provides two extreme data rate I/O (XIO) memory channels 321 and 322, and Cell BE interface unit (BEI) 323, which provides two high-speed external I/O channels and the internal interrupt control for Cell BE 300. BEI 323 is implemented as bus interface controllers (BICs, labeled BIC0 & BIC1) 324 and 325 and I/O interface controller (IOC) 326. The two high-speed external I/O channels connected to a polarity of Redwood Rambus® Asic Cell (RRAC) interfaces providing the flexible input and output (FlexIO_0 & FlexIO_1) 353 for the Cell BE 300.

Each SPU 310, 311, or 312 has a corresponding LS area 313, 314, or 315 and synergistic execution units (SXU) 354, 355, or 356. Each individual SPU 310, 311, or 312 can execute instructions (including data load and store operations) only from within its associated LS area 313, 314, or 315. For this reason, MFC direct memory access (DMA) operations via SPU's 310, 311, and 312 dedicated MFCs 305, 306, and 307 perform all required data transfers to or from storage elsewhere in a system.

A program running on SPU 310, 311, or 312 only references its own LS area 313, 314, or 315 using a LS address. However, each SPU's LS area 313, 314, or 315 is also assigned a real address (RA) within the overall system's memory map. The RA is the address for which a device will respond. In the Power PC®, an application refers to a memory location (or device) by an effective address (EA), which is then mapped into a virtual address (VA) for the memory location (or device) which is then mapped into the RA. The EA is the address used by an application to reference memory and/or a device. This mapping allows an operating system to allocate more memory than is physically in the system (i.e. the term virtual memory referenced by a VA). A memory map is a listing of all the devices (including memory) in the system and their corresponding RA. The memory map is a map of the real address space which identifies the RA for which a device or memory will respond.

This allows privileged software to map a LS area to the EA of a process to facilitate direct memory access transfers between the LS of one SPU and the LS area of another SPU. PPE 301 may also directly access any SPU's LS area using an EA. In the Power PC® there are three states (problem, privileged, and hypervisor). Privileged software is software that is running in either the privileged or hypervisor states. These states have different access privileges. For example, privileged software may have access to the data structures register for mapping real memory into the EA of an application. Problem state is the state the processor is usually in when running an application and usually is prohibited from accessing system management resources (such as the data structures for mapping real memory).

The MFC DMA data commands always include one LS address and one EA. DMA commands copy memory from one location to another. In this case, an MFC DMA command copies data between an EA and a LS address. The LS address directly addresses LS area 313, 314, or 315 of associated SPU 310, 311, or 312 corresponding to the MFC command queues. Command queues are queues of MFC commands. There is one queue to hold commands from the SPU and one queue to hold commands from the PXU or other devices. However, the EA may be arranged or mapped to access any other memory storage area in the system, including LS areas 313, 314, and 315 of the other SPEs 302, 303, and 304.

Main storage (not shown) is shared by PPU 308, PPE 301, SPEs 302, 303, and 304, and I/O devices (not shown) in a system, such as the system shown in FIG. 2. All information held in main memory is visible to all processors and devices in the system. Programs reference main memory using an EA. Since the MFC proxy command queue, control, and status facilities have RAs and the RA is mapped using an EA, it is possible for a power processor element to initiate DMA operations, using an EA between the main storage and local storage of the associated SPEs 302, 303, and 304.

As an example, when a program running on SPU 310, 311, or 312 needs to access main memory, the SPU program generates and places a DMA command, having an appropriate EA and LS address, into its MFC 305, 306, or 307 command queue. After the command is placed into the queue by the SPU program, MFC 305, 306, or 307 executes the command and transfers the required data between the LS area and main memory. MFC 305, 306, or 307 provides a second proxy command queue for commands generated by other devices, such as PPE 301. The MFC proxy command queue is typically used to store a program in local storage prior to starting the SPU. MFC proxy commands can also be used for context store operations.

The EA address provides the MFC with an address which can be translated into a RA by the MMU. The translation process allows for virtualization of system memory and access protection of memory and devices in the real address space. Since LS areas are mapped into the real address space, the EA can also address all the SPU LS areas.

PPE 301 on Cell BE chip 300 consists of 64-bit PPU 308 and Power PC® storage subsystem (PPSS) 309. PPU 308 contains processor execution unit (PXU) 329, level 1 (L1) cache 330, MMU 331 and replacement management table (RMT) 332. PPSS 309 consists of cacheable interface unit (CIU) 333, non-cacheable unit (NCU) 334, level 2 (L2) cache 328, RMT 335 and bus interface unit (BIU) 327. BIU 327 connects PPSS 309 to EIB 319.

SPU 310, 311, or 312 and MFCs 305, 306, and 307 communicate with each other through unidirectional channels that have capacity. Channels are essentially a FIFO which are accessed using one of 34 SPU instructions; read channel (RDCH), write channel (WRCH), and read channel count (RDCHCNT). The RDCHCNT returns the amount of information in the channel. The capacity is the depth of the FIFO. The channels transport data to and from MFCs 305, 306, and 307, SPUs 310, 311, and 312. BIUs 339, 340, and 341 connect MFCs 305, 306, and 307 to EIB 319.

MFCs 305, 306, and 307 provide two main functions for SPUs 310, 311, and 312. MFCs 305, 306, and 307 move data between SPUs 310, 311, or 312, LS area 313, 314, or 315, and main memory. Additionally, MFCs 305, 306, and 307 provide synchronization facilities between SPUs 310, 311, and 312 and other devices in the system.

MFCs 305, 306, and 307 implementation has four functional units: direct memory access controllers (DMACs) 336, 337, and 338, MMUs 316, 317, and 318, atomic units (ATOs) 342, 343, and 344, RMTs 345, 346, and 347, and BIUs 339, 340, and 341. DMACs 336, 337, and 338 maintain and process MFC command queues (MFC CMDQs) (not shown), which consist of a MFC SPU command queue (MFC SPUQ) and a MFC proxy command queue (MFC PrxyQ). The sixteen-entry, MFC SPUQ handles MFC commands received from the SPU channel interface. The eight-entry, MFC PrxyQ processes MFC commands coming from other devices, such as PPE 301 or SPEs 302, 303, and 304, through memory mapped input and output (MMIO) load and store operations. A typical direct memory access command moves data between LS area 313, 314, or 315 and the main memory. The EA parameter of the MFC DMA command is used to address the main storage, including main memory, local storage, and all devices having a RA. The local storage parameter of the MFC DMA command is used to address the associated local storage.

In a virtual mode, MMUs 316, 317, and 318 provide the address translation and memory protection facilities to handle the EA translation request from DMACs 336, 337, and 338 and send back the translated address. Each SPE's MMU maintains a segment lookaside buffer (SLB) and a translation lookaside buffer (TLB). The SLB translates an EA to a VA and the TLB translates the VA coming out of the SLB to a RA. The EA is used by an application and is usually a 32- or 64-bit address. Different application or multiple copies of an application may use the same EA to reference different storage locations (for example, two copies of an application each using the same EA, will need two different physical memory locations.) To accomplish this, the EA is first translated into a much larger VA space which is common for all applications running under the operating system. The EA to VA translation is performed by the SLB. The VA is then translated into a RA using the TLB, which is a cache of the page table or the mapping table containing the VA to RA mappings. This table is maintained by the operating system.

ATOs 342, 343, and 344 provide the level of data caching necessary for maintaining synchronization with other processing units in the system. Atomic direct memory access commands provide the means for the synergist processor elements to perform synchronization with other units.

The main function of BIUs 339, 340, and 341 is to provide SPEs 302, 303, and 304 with an interface to the EIB. EIB 319 provides a communication path between all of the processor cores on Cell BE chip 300 and the external interface controllers attached to EIB 319.

MIC 320 provides an interface between EIB 319 and one or two of XIOs 321 and 322. Extreme data rate (XDR™) dynamic random access memory (DRAM) is a high-speed, highly serial memory provided by Rambus®. A macro provided by Rambus accesses the extreme data rate dynamic random access memory, referred to in this document as XIOs 321 and 322.

MIC 320 is only a slave on EIB 319. MIC 320 acknowledges commands in its configured address range(s), corresponding to the memory in the supported hubs.

BICs 324 and 325 manage data transfer on and off the chip from EIB 319 to either of two external devices. BICs 324 and 325 may exchange non-coherent traffic with an I/O device, or it can extend EIB 319 to another device, which could even be another Cell BE chip. When used to extend EIB 319, the bus protocol maintains coherency between caches in the Cell BE chip 300 and the caches in the attached external device, which could be another Cell BE chip.

IOC 326 handles commands that originate in an I/O interface device and that are destined for the coherent EIB 319. An I/O interface device may be any device that attaches to an I/O interface such as an I/O bridge chip that attaches multiple I/O devices or another Cell BE chip 300 that is accessed in a non-coherent manner. IOC 326 also intercepts accesses on EIB 319 that are destined to memory-mapped registers that reside in or behind an I/O bridge chip or non-coherent Cell BE chip 300, and routes them to the proper I/O interface. IOC 326 also includes internal interrupt controller (IIC) 349 and I/O address translation unit (I/O Trans) 350.

Pervasive logic 351 is a controller that provides the clock management, test features, and power-on sequence for the Cell BE chip 300. Pervasive logic may provide the thermal management system for the processor. Pervasive logic contains a connection to other devices in the system through a Joint Test Action Group (JTAG) or Serial Peripheral Interface (SPI) interface, which are commonly known in the art.

Although specific examples of how the different components may be implemented have been provided, this is not meant to limit the architecture in which the aspects of the illustrative embodiments may be used. The aspects of the illustrative embodiments may be used with any multi-core processor system.

During the execution of an application or software, the temperature of areas within the Cell BE chip may rise. Left unchecked, the temperature could rise above the maximal specified junction temperature, leading to improper operation or physical damage. To avoid these conditions, the Cell BE chip's digital thermal management unit monitors and attempts to control the temperature within the Cell BE chip during operation. The digital thermal management unit consists of a thermal management control unit (TMCU) and ten distributed digital thermal sensors (DTSs) described herein.

One sensor is located in each of the eight SPEs, one is located in the PPE, and one is adjacent to a linear thermal diode. The linear thermal diode is an on-chip diode that calculates temperature. These sensors are positioned adjacent to areas within the associated unit that typically experience the greatest rise in temperature during the execution of most applications. The thermal control unit monitors feedback from each of these sensors. If the temperature of a sensor rises above a programmable point, the thermal control unit can be configured to cause an interrupt to the PPE or one or more of the SPEs and dynamically throttle the execution of the associated PPE or SPE(s).

Stopping and running the PPE or SPE for a programmable number of cycles provides the necessary throttling. The interrupt allows privileged software to take corrective action while the dynamic throttling attempts to keep the temperature within the broadband engine chip below a programmable level without software intervention. Privileged software sets the throttling level equal to or below recommended settings provided by the application. Each application may be different.

If throttling the PPE or SPEs does not effectively manage the temperature and the temperature continues to rise, pervasive logic 351 stops the Cell BE chip's clocks when the temperature reaches a thermal overload temperature (defined by programmable configuration data). The thermal overload feature protects the Cell BE chip from physical damage. Recovery from this condition requires a hard reset. The temperature of the region monitored by the DTSs is not necessarily the hottest point within the associated PPE or SPE.

Figure 4:
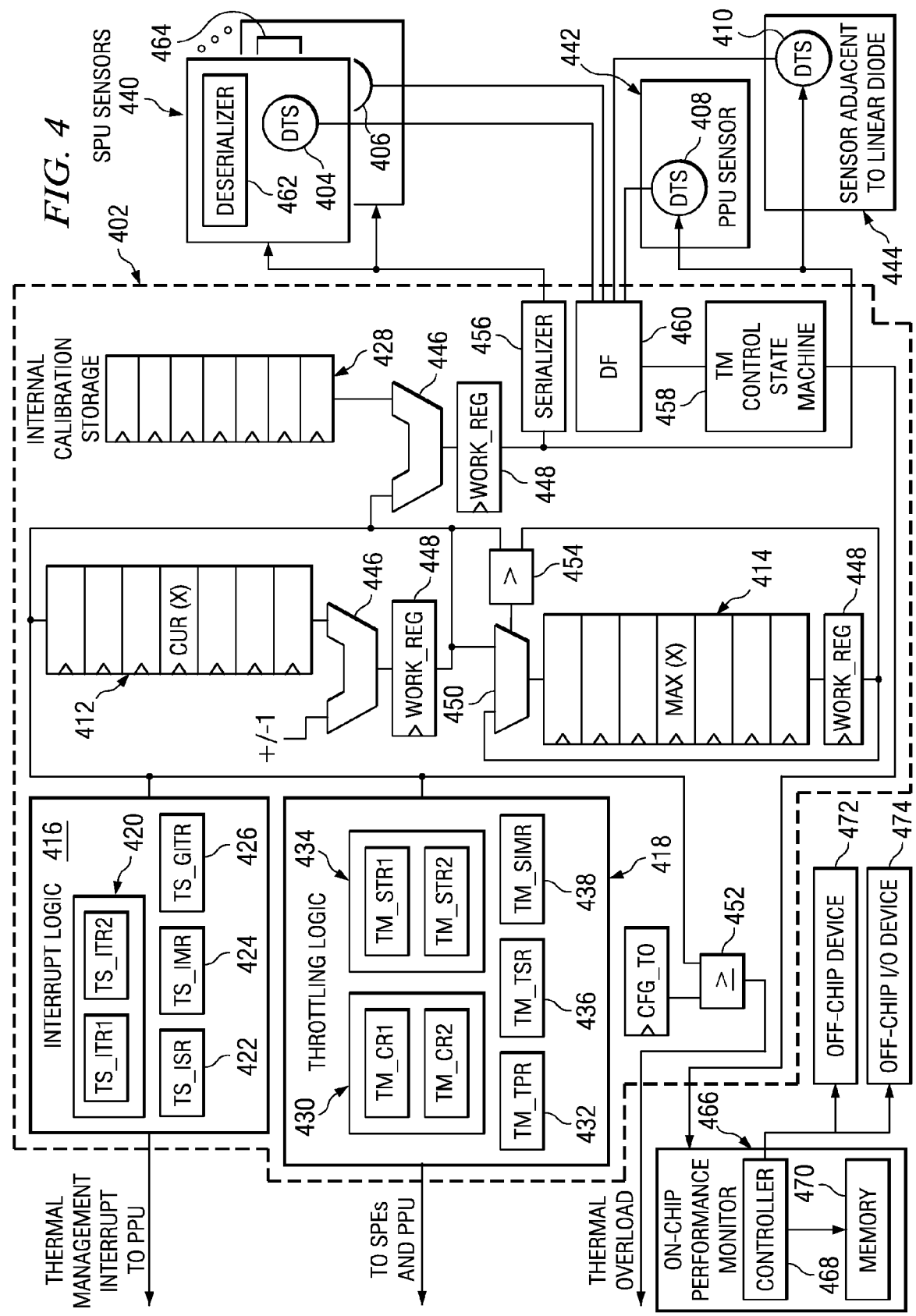
FIG. 4 illustrates an exemplary thermal management system in accordance with an illustrative embodiment.

FIG. 4 illustrates an exemplary thermal management system in accordance with an illustrative embodiment. The thermal management system may be implemented as an integrated circuit, such as that as provided by pervasive logic unit 351 of FIG. 3. The thermal management system may be an application specific integrated circuit, a processor, a multiprocessor, or a heterogeneous multi-core processor. The thermal management system is divided between ten distributed DTSs, for simplicity only DTSs 404, 406, 408, and 410 are shown, and thermal management control unit (TMCU) 402. Each of DTS 404 and 406, which are in SPU sensors 440, DTS 408, which is in PPU sensor 442, and DTS 410, which is in sensor 444 that is adjacent to a linear thermal diode (not shown), provide a current temperature detection signal. This signal indicates that the temperature is equal to or below the current temperature detection range set by TMCU 402. TMCU 402 uses the state of the signals from DTSs 404, 406, 408, and 410 to continually track the temperature of each PPE's or SPE's DTSs 404, 406, 408, or 410. As the temperature is tracked, TMCU 402 provides the current temperature as a numeric value that represents the temperature within the associated PPE or SPE. The manufacturing to calibrate the individual sensors sets internal calibration storage 428.

In addition to the elements of TMCU 402 described above, TMCU 402 also contains multiplexers 446 and 450, work registers 448, comparators 452 and 454, serializer 456, thermal management control state machine 458, and data flow (DF) unit 460. Multiplexers 446 and 450 combine various outgoing and incoming signals for transmission over a single medium. Work registers 448 hold the results of multiplications performed in TMCU 402. Comparators 452 and 454 provide a comparison function of two inputs. Comparator 452 is a greater than or equal to comparator. Comparator 454 is a greater than comparator. Serializer 456 converts low-speed parallel data from a source into high-speed serial data for transmission. Serializer 456 works in conjunction with deserializers 462 and 464 on SPU sensors 440. Deserializers 462 and 464 converts received high-speed serial data into low-speed parallel data. Thermal management control state machine 458 starts the internal initialization of TMCU 402. DF unit 460 controls the data to and from thermal management control state machine 458.

TMCU 402 may be configured to cause an interrupt to the PPE, using interrupt logic 416, to dynamically throttle the execution of a PPE or a SPE, using throttling logic 418.

TMCU 402 compares the numeric value representing the temperature to a programmable interrupt temperature and a programmable throttle point. Each DTS has an independent programmable interrupt temperature. If the temperature is within the programmed interrupt temperature range, TMCU 402 generates an interrupt to the PPE, if enabled. An interrupt is generated if the temperature is above or below the programmed level depending on the direction bit, described later. In addition, a second programmable interrupt temperature may cause the assertion of an attention signal to a system controller. The system controller is on the system planer and is connected to the Cell BE on the SPI port.

If the temperature sensed by the DTS associated with the PPE or SPE is equal to or above the throttling point, TMCU 402 throttles the execution of a PPE or one or more SPEs by starting and stopping that PPE or SPE independently. Software can control the ratio and frequency of the throttling using thermal management registers, such as thermal management stop time registers and thermal management scale registers.

Figure 5:
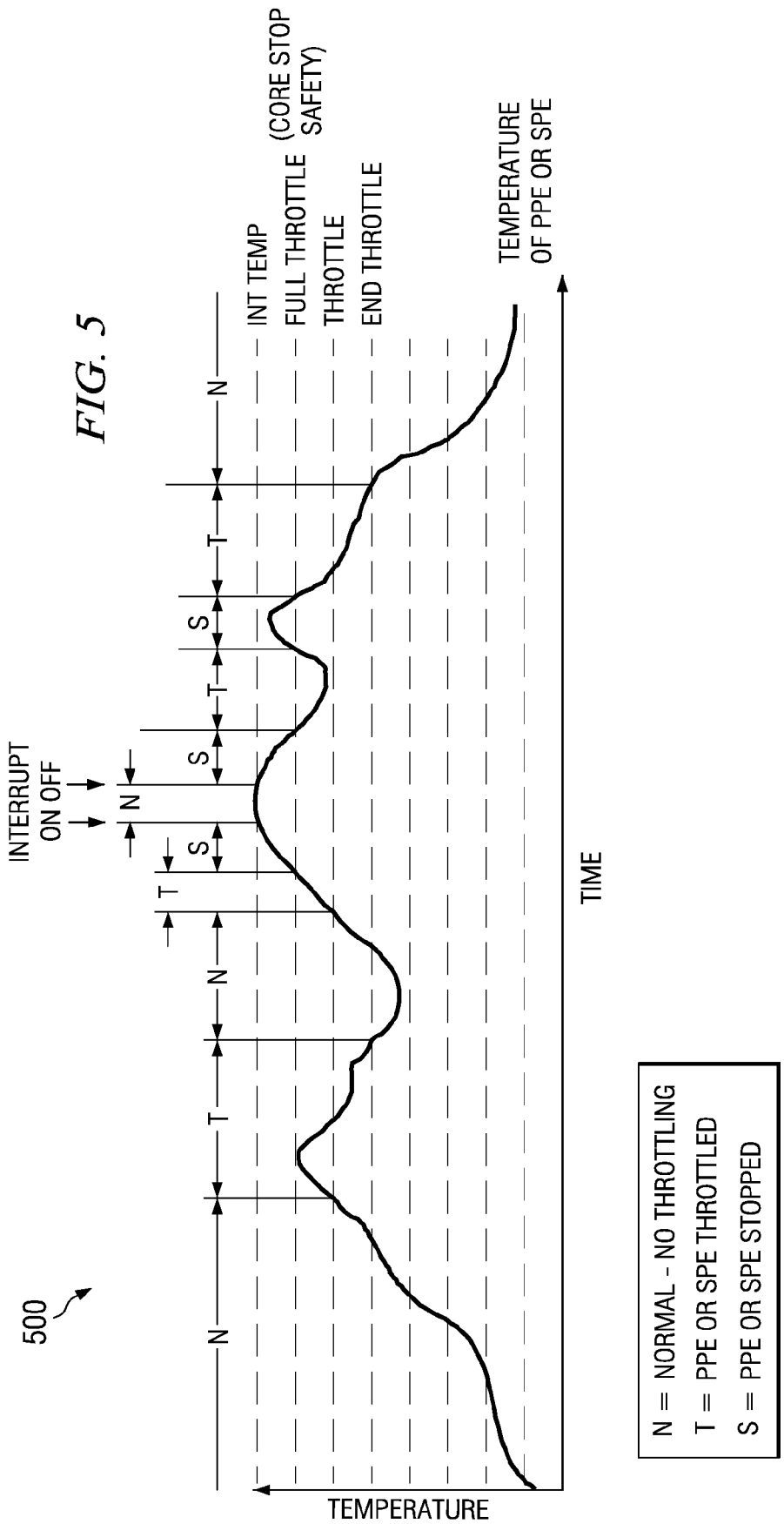
FIG. 5 depicts a graph of temperature and the various points at which interrupts and dynamic throttling may occur in accordance with an illustrative embodiment.

FIG. 5 depicts a graph of temperature and the various points at which interrupts and dynamic throttling may occur in accordance with an illustrative embodiment. In FIG. 5, line 500 may represent the temperature for the PPE or the SPE. If the PPE or SPE is running normally, there is no throttling in the regions marked with an "N." When the temperature of a PPE or SPE reaches the throttle point, the TMCU starts throttling the execution of the associated PPE or SPE. The regions in which the throttling occurs are marked with a "T." When the temperature of the PPE or SPE drops below the end throttle point, the execution returns to normal operation.

If, for any reason, the temperature continues to rise and reaches a temperature at or above the full throttle point, TMCU 402 stops the PPE or SPE until the temperature drops below the full throttle point. Regions where the PPE or SPE is stopped are marked with an "S." Stopping the PPE or SPEs when the temperature is at or above the full throttle point is referred to as the core stop safety.

In this exemplary illustration, the interrupt temperature is set above the throttle point; therefore, TMCU 402 generates an interrupt which is a notification to the software that the corresponding PPE or SPEs is stopped because the temperature was or is still above the core stop temperature; provided that the thermal interrupt mask register (TM_ISR) is set to active, see 422 in FIG. 4, allowing the PPE or SPE to resume during a pending interrupt. If dynamic throttling is disabled, privileged software manages the thermal condition. Not managing the thermal condition can result in an improper operation of the associated PPE or SPE or a thermal shutdown by the thermal overload function.

Returning to FIG. 4, the thermal sensor status registers consist of thermal sensor current temperature status registers 412 and thermal sensor maximum temperature status registers 414. These registers allow software to read the current temperature of each DTS, determine the highest temperature reached during a period of time, and cause an interrupt when the temperature reaches a programmable temperature. The thermal sensor status registers have associated real address pages which may be marked as hypervisor privileged.

Thermal sensor current temperature status registers 412 contain the encoding or digital value for the current temperature of each DTS. Due to latencies in the sensor's temperature detection, latencies in reading these registers, and normal temperature fluctuations, the temperature reported in these registers is that of an earlier point in time and might not reflect the actual temperature when software receives the data. As each sensor has dedicated control logic, control logic within DTSs 404, 406, 408, and 410 samples all sensors in parallel. TMCU 402 updates the contents of thermal sensor current temperature status registers 412 at the end of the sample period. TMCU 402 changes the value in thermal sensor current temperature status registers 412 to the current temperature. TMCU 402 polls for new current temperatures every SenSampTime period. A SenSampTime configuration field controls the length of a sample period.

Thermal sensor maximum temperature status registers 414 contain the digitally encoded maximal temperature reached for each sensor from the time thermal sensor maximum temperature status registers 414 were last read. Reading these registers, by software or any off-chip device, such as off-chip device 472 or off-chip I/O device 474, causes TMCU 402 to copy the current temperature for each sensor into the register. After the read, TMCU 402 continues to track the maximal temperature starting from this point. Each register's read is independent. A read of one register does not affect the contents of the other.

Each sensor has dedicated control logic, so control logic within DTSs 404, 406, 408, and 410 samples all sensors in parallel. TMCU 402 changes the value in thermal sensor maximum temperature status registers 414 to the current temperature. TMCU 402 polls for new current temperatures every SenSampTime period. A SenSampTime configuration field controls the length of a sample period.

Thermal sensor interrupt registers in interrupt logic 416 control the generation of a thermal management interrupt to the PPE. This set of registers consists of thermal sensor interrupt temperature registers 420 (TS_ITR1 and TS_ITR2), thermal sensor interrupt status register 422 (TS_ISR), thermal sensor interrupt mask register 424 (TS_IMR), and the thermal sensor global interrupt temperature register 426 (TS_GITR). Thermal sensor interrupt temperature registers 420 and the thermal sensor global interrupt temperature register 426 contain the encoding for the temperature that causes a thermal management interrupt to the PPE.

When the temperature, encoded in a digital format, in thermal sensor current temperature status registers 412 for a sensor is greater than or equal to the corresponding sensor's interrupt temperature encoding in thermal sensor interrupt temperature registers 420, TMCU 402 sets the corresponding status bit in thermal sensor interrupt status register 422 (TS_ISR[Sx]). When the temperature encoding in thermal sensor current temperature status registers 412 for any sensor is greater than or equal to the global interrupt temperature encoding in thermal sensor global interrupt temperature register 426, TMCU 402 sets the corresponding status bits in thermal sensor interrupt status register 422 (TS_ISR[Gx]).

If any thermal sensor interrupt temperature status register 422 bit (TS_ISR[Sx]) is set and the corresponding mask bit in the thermal sensor interrupt mask register 424 (TS_IMR[Mx]) is also set, TMCU 402 asserts a thermal management interrupt signal to the PPE. If any thermal sensor interrupt status register 422 (TS_ISR[Gx]) bit is set and the corresponding mask bit in the thermal sensor interrupt mask register 424 (TS_IMR[Cx]) is also set, TMCU 402 asserts a thermal management interrupt signal to the PPE.

To clear the interrupt condition, privileged software should set any corresponding mask bits in thermal sensor interrupt mask register to '0'. To enable a thermal management interrupt, privileged software ensures that the temperature is below the interrupt temperature for the corresponding sensors and then performs the following sequence. Enabling an interrupt when the temperature is not below the interrupt temperature can result in an immediate thermal management interrupts being generated.

1. Write a '1' to the corresponding status bit in the thermal sensor interrupt status register 422.
2. Write a '1' to the corresponding mask bit in the thermal sensor interrupt mask register 424.

The thermal sensor interrupt temperature registers 420 contain the interrupt temperature level for the sensors located in the SPEs, PPE, and adjacent to the linear thermal diode. TMCU 402 compares the encoded interrupt temperature levels in this register to the corresponding interrupt temperature encoding in the thermal sensor current temperature status registers 412. The results of these comparisons generate a thermal management interrupt. Each sensor's interrupt temperature level is independent.

In addition to the independent interrupt temperature levels set in the thermal sensor interrupt temperature registers 420; the thermal sensor global interrupt temperature register 426 contains a second interrupt temperature level. This level applies to all sensors in the Cell BE chip. TMCU 402 compares the encoded global interrupt temperature level in this register to the current temperature encoding for each sensor. The results of these comparisons generate a thermal management interrupt.

The intent of the global interrupt temperature is to provide an early indication to a temperature rise in the Cell BE chip. Privileged software and the system controller may use this information to start actions to control the temperature, for example, increasing the fan speed, rebalancing the application software across units, and so on.

Thermal sensor interrupt status register 422 identifies which sensors meet the interrupt conditions. An interrupt condition refers to a particular condition that each thermal sensor interrupt status register 422 bit has that, when met, makes it possible for an interrupt to occur. An actual interrupt is only presented to the PPE if the corresponding mask bit is set.

Thermal sensor interrupt status register 422 contains three sets of status bits—the digital sensor global threshold interrupt status bit (TS_ISR[Gx]), the digital sensor threshold interrupt status bit (TS_ISR[Sx]), and the digital sensor global below threshold interrupt status bit (TS_ISR[Gb]).

TMCU 402 sets the status bit in thermal sensor interrupt status register 422 (TS_ISR[Sx]) when the temperature encoding for a sensor in thermal sensor current temperature status registers 412 is greater than or equal to the corresponding sensor's interrupt temperature encoding in thermal sensor interrupt temperature registers 420 and the corresponding direction bit thermal sensor interrupt mask register 424, TM_IMR[Bx]='0'. Additionally, TMCU 402 sets thermal sensor interrupt status register 422, TS_ISR[Sx], when the temperature encoding for a sensor in thermal sensor current temperature status registers 412 is below the corresponding sensor's interrupt temperature encoding in thermal sensor interrupt temperature registers 420 and the corresponding direction bit thermal sensor interrupt mask register 424, TM_IMR[Bx]='1'.

TMCU 402 sets thermal sensor interrupt status register 422, TS_ISR[Gx], when any participating sensor's current temperature is greater than or equal to that of thermal sensor global interrupt temperature register 426 and thermal sensor interrupt mask register 424, TS_IMR[$B_G$], to '0'. The individual thermal sensor interrupt status register 422, TS_ISR[Gx], bits indicate which individual sensors meet these conditions.

TMCU 402 sets thermal sensor interrupt status register 422, TS_ISR[Gb], when all of the participating sensors in thermal sensor interrupt mask register 424, TS_IMR[Cx], have a current temperature below that of thermal sensor global interrupt temperature register 426 and the thermal sensor interrupt mask register 424, TS_IMR[B$_G$], to '1'. Since all participating sensors have a current temperature below that of the thermal sensor global interrupt temperature register 426, only one status bit thermal sensor interrupt status register 422 (TS_ISR[Gb]) is present for a global below threshold interrupt condition.

Once a status bit in the thermal sensor interrupt status register 422 (TS_ISR[Sx], [Gx], or [Gb]) is set to '1', TMCU 402 maintains this state until reset to '0' by privileged software. Privileged software resets a status bit to '0' by writing a '1' to the corresponding bit in thermal sensor interrupt status register 422.

The thermal sensor interrupt mask register 424 contains two fields for individual sensors and multiple fields for global interrupt conditions. An interrupt condition refers to a particular condition that each thermal sensor interrupt mask register 424 bit has that, when met, makes it possible for an interrupt to occur. An actual interrupt is only presented to the PPE if the corresponding mask bit is set.

The two thermal sensor interrupt mask register digital thermal threshold interrupt fields for individual sensors are TS_IMR[Mx] and the TS_IMR[Bx]. Thermal sensor interrupt mask register 424, TS_IMR[Mx], mask bits prevent an interrupt status bit from generating a thermal management interrupt to the PPE. Thermal sensor interrupt mask register 424, TS_IMR[Bx], directional bits set the temperature direction for the interrupt condition above or below the corresponding temperature in thermal sensor interrupt temperature registers 420. Setting thermal sensor interrupt mask register 424, TS_IMR[Bx], to '1' sets the temperature for the interrupt condition to be below the corresponding temperature in thermal sensor interrupt temperature registers 420. Setting thermal sensor interrupt mask register 424, TS_IMR[Bx], to '0' sets the temperature for the interrupt condition to be equal to or above the corresponding temperature in thermal sensor interrupt temperature registers 420.

Thermal sensor interrupt mask register 424 fields for the global interrupt conditions are TS_IMR[Cx], TS_IMR[B$_G$], TS_IMR[Cgb], and TS_IMR[A]. Thermal sensor interrupt mask register 424, TS_IMR[Cx], mask bits prevent global threshold interrupts and select which sensors participate in the global below threshold interrupt condition. Thermal sensor interrupt mask register 424, TS_IMR[B$_G$], directional bit selects the temperature direction for the global interrupt condition. Thermal sensor interrupt mask register 424, TS_IMR [Cgb], mask bit prevents global below threshold interrupts. Thermal sensor interrupt mask register 424, TS_IMR[A], asserts an attention to the system controller. An attention is a signal to the system controller indicating that the pervasive logic needs attention or has status for the system controller. The attention may be mapped to an interrupt in the system controller. The system controller is on the system planer and is connected to the Cell Broadband Engine on the SPI port.

Setting thermal sensor interrupt mask register 424, TS_IMR[B$_G$], to '1' sets a temperature range for the global interrupt condition to occur when the temperatures of all the participating sensors set in thermal sensor interrupt mask register 424, TS_IMR[Cx], are below the global interrupt temperature level. Setting thermal sensor interrupt mask register 424, TS_IMR[B$_G$], to '0' sets a temperature range for the global interrupt condition to occur when the temperature of any of the participating sensors is greater than or equal to the corresponding temperature in thermal sensor global interrupt temperature register 426. If thermal sensor interrupt mask register 424, TS_IMR[A], is set to '1', TMCU 402 asserts an attention when any thermal sensor interrupt mask register 424, TS_IMR[Cx], bit and its corresponding thermal sensor interrupt status register 422 status bit (TS_ISR[Gx]) are both set to '1'. Additionally, TMCU 402 asserts an attention when thermal sensor interrupt mask register 424, TS_IMR[Cgb], and thermal sensor interrupt status register 422, TS_ISR[Gb], are both set to '1'.

TMCU 402 presents a thermal management interrupt to the PPE when any thermal sensor interrupt mask register 424, TS_IMR[Mx], bit and its corresponding thermal sensor interrupt status register 422 status bit (TS_ISR[Sx]) are both set to '1'. TMCU 402 generates a thermal management interrupt when any thermal sensor interrupt mask register 424, TS_IMR[Cx], bit and its corresponding thermal sensor interrupt status register 422 status bit, TS_ISR[Gx], are both set to '1'. Additionally, TMCU 402 presents a thermal management interrupt to the PPE when thermal sensor interrupt mask register 424, TS_IMR[Cgb], and thermal sensor interrupt status register 422, TS_ISR[Gb], are both set to '1'.

The dynamic thermal management registers in throttling logic 418 contain parameters for controlling the execution throttling of a PPE or a SPE. Dynamic thermal management registers is a set of registers that contains thermal management control registers 430 (TM_CR1 and TM_CR2), thermal management throttle point register 432 (TM_TPR), thermal management stop time registers 434 (TM_STR1 and TM_STR2), thermal management throttle scale register 436 (TM_TSR), and thermal management system interrupt mask register 438 (TM_SIMR).

Thermal management throttle point register 432 sets the throttle temperature point for the sensors. Two independent throttle temperature points can be set in thermal management throttle point register 432, ThrottlePPE and ThrottleSPE, one for the PPE and one for the SPEs. Also contained in this register are temperature points for disabling throttling and stopping the PPE or SPEs. Execution throttling of a PPE or a SPE starts when the temperature is equal to or above the throttle point. Throttling ceases when the temperature drops below the temperature to disable throttling (TM_TPR [EndThrottlePPE/EndThrottleSPE]). If the temperature reaches the full throttle or stop temperature (TM_TPR [FullThrottlePPE/FullThrottleSPE]), TMCU 402 stops the execution of the PPE or SPE. Thermal management control registers 430 control the throttling behavior.

Thermal management stop time registers 434 and thermal management throttle scale register 436 control the frequency and amount of throttling. When the temperature reaches the throttle point, TMCU 402 stops the corresponding PPE or SPE for the number of clocks specified by the stop time in the corresponding value in thermal management stop time registers 434, multiplied by the corresponding scale value in thermal management scale register 436. TMCU 402 then allows the PPE or SPE to run for the number of clocks specified by the run time multiplied by the corresponding scale value, where the run time is the difference between an implementation dependent fixed amount of time minus the stop time. The scale value, which is programmable, in thermal management scale register 436 is a multiplier for both the stop time and run time. An examples may be (Stop×Scale)/(Run×Scale). The percentage of time a core is stopped remains the same, but the period is increased or frequency is decreased. This sequence continues until the temperature falls below the disable throttling (TM_TPR[EndThrottlePPE/EndThrottleSPE]).

Thermal management system interrupt mask register 438 selects which PPE interrupts will cause TMCU 402 to disable throttling. TMCU 402 will continue to prevent throttling while these interrupts are still pending and the mask is still selecting the pending interrupt. If the mask is deselected or the interrupt is no longer pending, TMCU 402 will no longer prevent throttling.

Thermal management control registers 430 set the throttling mode for each PPE or SPE independently. The control bits are split between two registers. Following are the five different modes that may be set for each PPE or SPE independently:

Dynamic throttling disabled (including the core stop safety).
Normal operation (dynamic throttling and the core stop safety are enabled).
PPE or SPE is always throttled (core stop safety is enabled).
Core stop safety disabled (dynamic throttling enabled and the core stop safety are disabled).
PPE or SPE is always throttled and core stop safety disabled.

Privileged software should set control bits to normal operation for PPE or SPEs that are running applications or operating systems. If a PPE or a SPE is not running application code, privileged software should set the control bits to disabled. The "PPE or SPE is always throttled" modes are intended for application development. These modes are useful to determine if the application can operate under an extreme throttling condition. Allowing a PPE or a SPE to execute with either the dynamic throttling or core stop safety disabled should only be permitted when privileged software actively manages the thermal events.

Thermal management system interrupt mask register 438 controls which PPE interrupts cause the thermal management logic to temporarily stop throttling the PPE. TMCU 402 temporarily suspends throttling for both threads while the interrupt is pending, regardless of the thread targeted by the interrupt. When the interrupt is no longer pending, throttling may resume as long as throttle conditions still exist. Throttling of the SPEs is never disabled based on a system interrupt condition. The PPE interrupt conditions that can override a throttling condition are as follows:

External
Decrementer
Hypervisor Decrementer
System Error
Thermal Management

Thermal management throttle point register 432 contains the encoded temperature points at which execution throttling of a PPE or a SPE begins and ends. This register also contains encoded temperature points at which a PPE's or a SPE's execution is fully throttled.

Software uses the values in the thermal management throttle point register to set three temperature points for changing between the three thermal management states: normal run (N), PPE or SPE throttled (T), and PPE or SPE stopped (S). TMCU 402 supports independent temperature points for the PPE and the SPEs.

When the encoded current temperature of a sensor in thermal sensor current temperature status registers 412 is equal to or greater than the throttle temperature (ThrottlePPE/ThrottleSPE), execution throttling of the corresponding PPE or SPE begins, if enabled. Execution throttling continues until the encoded current temperature of the corresponding sensor is less than the encoded temperature to end throttling (EndThrottlePPE/EndThrottleSPE). As a safety measure, if the encoded current temperature is equal to or greater than the full throttle point (FullThrottlePPE/FullThrottleSPE), TMCU 402 stops the corresponding PPE or SPE.

Thermal management stop time registers 434 control the amount of throttling applied to a specific PPE or SPE in the thermal management throttled state. The value, which is set by software, in the thermal management stop time registers 434 represents the amount of time the core will be stopped relative to the amount of time the core is allowed to run (stop/run) or the percentage of time the core is stopped. The thermal management throttle scale register 436 controls the actual number of clocks (NClks) that a PPE or a SPE stops and runs.

Thermal management throttle scale register 436 controls the actual number of cycles that a PPE or a SPE stops and runs during the thermal management throttle state. The values in this register are multiples of a configuration ring setting TM_Config[MinStopSPE]. The following equation calculates the actual number of stop and run cycles:

SPE Run and Stop Time:
  SPE_StopTime=(TM_STR1[StopCore(x)]*TM_Config[MinStopSPE])*TM_TSR[ScaleSPE]
  SPE RunTime=(32−TM_STR1[StopCore(x)])* TM_Config[MinStopSPE])*TM_TSR[ScaleSPE]
Power PC® element Run and Stop Time:
  PPE_StopTime=(TM_STR2[StopCore(8)]*TM_Config[MinStopPPE])*TM_TSR[ScalePPE]
  PPE_RunTime=(32−TM_STR2[StopCore(8)])* TM_Config[MinStopPPE])*TM_TSR[ScalePPE]

The run and stop times can be altered by interrupts and privileged software writing various thermal management registers.

On-chip performance monitor 466 may provide performance monitoring that may trace thermal data provided by temperature sensing devices, such as DTSs 404, 406, 408, and 410. The thermal data may be stored in memory 470 or written to off-chip device 472, such as main memory 208 of FIG. 2, or to an off-chip I/O device 474, such as south bridge and input/output (I/O) controller hub (ICH) 204 of FIG. 2. Controller 468 located in performance monitor 466 controls the determination of where the thermal data is sent.

Although the following descriptions are directed to one instruction stream and one processor, the instruction stream may be a set of instruction streams, and the processor may be a set of processors. That is, a set may be just a single instruction stream and single processor or two or more instructions streams and processors.

Utilizing the above described architecture, many improvements and added programmability are made for the thermal management and thermal throttling of the Cell BE chip. Some of these improvements and added programmability enable key features why others enhance usability.

Figure 6:
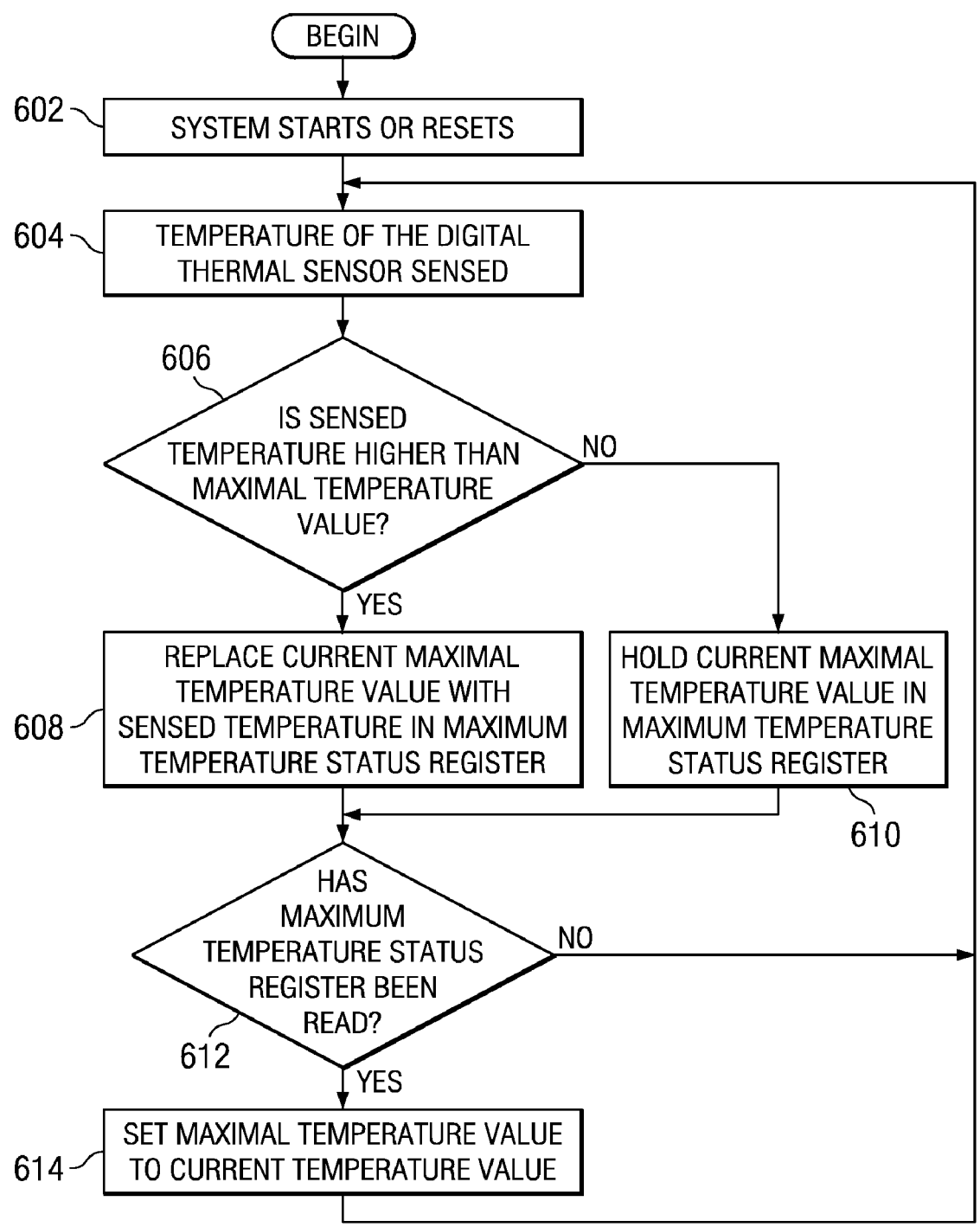
FIG. 6 depicts a flow diagram of the operation for logging maximal temperature in accordance with an illustrative embodiment.

FIG. 6 depicts a flow diagram of the operation for logging maximal temperature in accordance with an illustrative embodiment. As the operation begins, the computer system which contains a Cell BE chip, such as Cell BE chip 300 of FIG. 3, starts or resets (step 602). As previously described, the Cell BE chip includes a thermal management system that is provided through pervasive logic unit 351 of FIG. 3. The thermal management system includes one set of maximum temperature status registers and one set of current temperature status registers, such as maximum temperature status registers 414 and current temperature status registers 412 of FIG. 4, for each DTS, such as DTSs 404, 406, 408, and 410 of FIG. 4. The current temperature status register stores the current temperature of its target DTS since the last time thermal management control state machine, such as thermal management control state machine 458 of FIG. 4, sensed the DTS. The maximum temperature status register stores the maximal temperature of its target DTS since the last time the computer system reads the within the maximum temperature status register or the computer system resets. The maximum temperature status register may be read using any number of devices, such as a processor, an integrated circuit, or through a device using the Serial Peripheral Interface (SPI) port or Joint Test Action Group (JTAG) port. Although, reading the register through the JTAG port does not cause a reset.

Illustratively limiting the following discussion to one DTS, the maximal temperature after the computer system starts or resets (step 602) is zero. Once the thermal management control state machine senses the temperature of the DTS, the thermal management control state machine sends the sensed temperature of the DTS to a comparator, such as comparator 454 of FIG. 4 (step 604). The comparator compares the sensed temperature to the current maximal temperature stored in the maximum temperature status register for that DTS (step 606). If at step 606 the sensed temperature is higher than the current maximal temperature stored in the maximum temperature status register, then the sensed temperature becomes the new maximal temperature and the thermal management control state machine logs the new maximal temperature in the maximum temperature status register (step 608). That is, the thermal management control state machine overwrites or replaces the current maximal temperature stored in the maximum temperature status register. If at step 606 the sensed temperature is lower than or equal to the current maximal temperature stored in the maximum temperature status register, the maximum temperature status register holds the current maximal temperature existing in the maximum temperature status register (step 610).

The current maximal temperature in the maximum temperature status register stays at the maximal temperature until the computer system reads the maximum temperature status register in the form of a read request (step 612) or the computer system resets. If the current maximal temperature is not read, the operation returns to step 604. If at step 612 the computer system reads the current maximal temperature, then the thermal management control state machine resets the current maximal temperature to the current temperature in the current temperature status register (step 614), with the operation returning to step 604.

For an example of this operation, if a DTS of a particular unit, such as the core of a processor or the processor itself, over a period of time were to sense temperatures of: 67° C., 70° C., 75° C., 72° C., and 74° C., the maximal temperature in the maximum temperature status register would be 75° C. If after the fourth sensing of the DTS, the computer system issues a read request, the maximal temperature returned would be 75° C. However, at this point the thermal management control state machine resets the maximal temperature to the current temperature and after the last sense performed by the DTS, the maximal temperature in the maximum temperature status register would be 74° C.

Thus, the intent of the maximum temperature status register is to log the maximal temperature reached by the DTSs since the maximum temperature register was last read. This maximal temperature information assists the operating system in determining the maximal temperature reached by the DTS during the execution of an application or program without continuously polling the current temperature register. Continuous polling would affect the performance of the system and therefore could affect the maximal temperature. In addition, polling the current temperature does not guarantee the maximal temperature is read. This would be the case if the maximal temperature occurred between reads of the current temperature.

Figure 7:
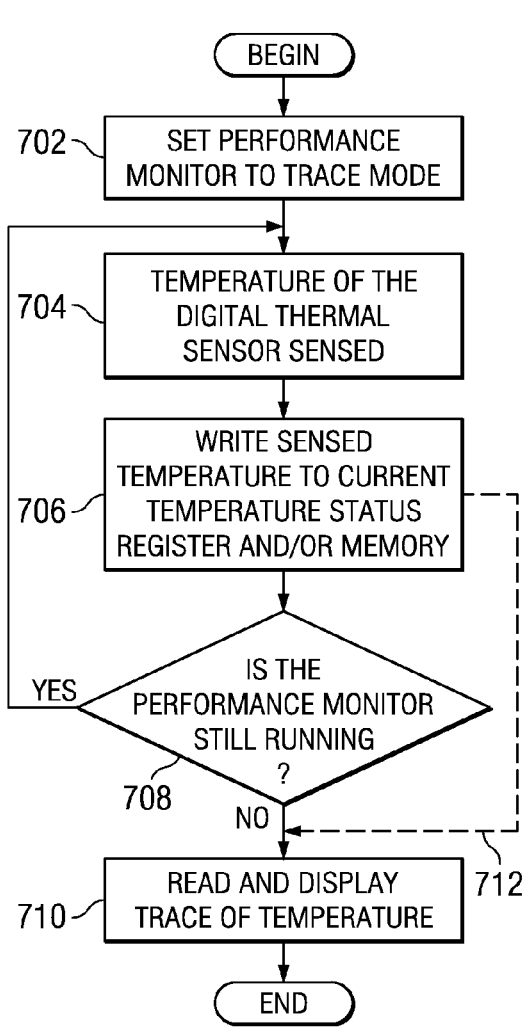
FIG. 7 depicts a flow diagram of the operation for tracing thermal data via performance monitoring in accordance with another illustrative embodiment.

FIG. 7 depicts a flow diagram of the operation for tracing thermal data via performance monitoring in accordance with another illustrative embodiment. As previously described, the Cell BE chip includes a thermal management system that is provided through pervasive logic unit 351 of FIG. 3. Performance monitoring may be provided through a performance monitor, such as performance monitor 466 of FIG. 4. Performance monitoring may trace thermal data provided by temperature sensing devices, such as DTSs 404, 406, 408, and 410 of FIG. 4, in its internal memory, such as memory 470 of FIG. 4, write to main memory, such as main memory 208 of FIG. 2 or off chip device 472 of FIG. 4, or to an I/O device, such as south bridge and input/output (I/O) controller hub (ICH) 204 of FIG. 2 or off chip I/O device 474 of FIG. 4.

Performance monitoring supports two main tracing modes: tracing for a fixed time period or continuous tracing. The trace of thermal performance may be a trace, such as trace 500 of FIG. 5. Performance monitoring may also provide for configuration of the sampling frequency to control the time period between two consecutive samples. Furthermore, compression of the thermal information can be used to increase the sampling interval. One compression technique is to only store the thermal information when a change occurs. A count of the number of thermal samples which were the same could also be stored along with the thermal information. This is a useful technique since thermal information is typically slow to change.

As the operation for tracing thermal data via a performance monitor begins, the thermal management control state machine, such as thermal management control state machine 458 of FIG. 4, sets the performance monitor into a tracing mode (step 702). Illustratively, limiting the following discussion to one DTS, the thermal management control state machine senses the temperature of the DTS (step 704) and sends the sensed temperature of the DTS to a current temperature status register and/or other data structure to be stored (step 706). At this point the thermal management control state machine determines whether the performance monitor is still running (step 708). Once the performance monitor starts in step 702, the performance monitor will either run for a user specified time period or run until stopped by the user through a user input. However, the performance monitor may also stop based on a specific thermal condition. The specific thermal condition is called a trigger, such as a logic analyzer looking for a specific condition on a set of signals. The use of a trigger may be useful in software debug. For example, a user may setup the performance monitor to stop, or checkstop, the system when a thermal condition is reached. This may allow the user to determine exactly which piece of code or combination of code is causing the thermal condition. If the performance monitor is still running at step 708, the operation returns to step 704.

Returning to step 708, if the performance monitor is no longer running, the thermal management control state machine reads the temperature information stored in the memory and graphically displays the stored information for the user (step 710), with the operation ending thereafter. It is also possible for the sensed temperature sent to a current temperature status register and/or other data structure at step 706 to be simultaneously displayed while the operation is still in process (step 710) indicated by arrow 712, rather than waiting for the tracing to end.

Thus, the performance monitor traces thermal data provided by the DTSs. Automatically tracing thermal data eliminates the need for software to continuously poll the current temperature register. Performance monitoring is important for collecting thermal data of a workload because performance monitoring does not require insertion of additional code to poll the thermal data, which could change the behavior of the workload. In other words, performance monitoring provides a non-invasive method to trace thermal profile of software applications in real-time. An additional benefit of sending the thermal information to the performance monitor is the ability to trigger or stop recording the thermal information on a pre-specified thermal condition. In addition, the performance monitor may also be used to stop the system (or checkstop) when a thermal condition is met. Doing so allows a user to determine which code segment or combination of code segments is creating the thermal condition. The user may then rewrite the code segment or avoid the specific combination, thus avoiding the thermal event.

FIGS. 8A and 8B depict flow diagrams of the operation for advanced thermal interrupt generation in accordance with an additional illustrative embodiment. As previously described, the Cell BE chip includes a thermal management system that is provided through pervasive logic unit 351 of FIG. 3. Advanced thermal interrupt generation is another feature that helps an operating system to handle a thermal event. Advanced thermal interrupt logic is part of a thermal management control unit, such as TMCU 402 of FIG. 4. Thermal interrupts alert the operating system when there is a thermal condition (i.e. chip temperature rises above certain threshold). In such an event, the operating system should take corrective actions to reduce chip temperature. The corrective actions may be handled by a software interrupt handler, which is a piece of code which handles the thermal condition and initiates the corrective actions. The operating system then waits for the thermal condition to go away before resuming normal operation. This usually requires the operating system to wait a specific amount of time, then poll the temperature of the processor to determine if it is safe to resume normal operation. With the advanced thermal interrupt generation, the operating system may set the interrupt to detect when the temperature falls below a certain threshold, thus eliminating the need to poll the current temperature registers. The combination thermal sensor interrupt mask register 424 (TS_IMR) and thermal sensor interrupt status register 422 (TS_ISR) of FIG. 4 make handling a thermal event much easier for the operating system.

Advanced thermal interrupt generation may be performed at a local level and a global level. That is, advanced thermal interrupt generation may be performed either individually (local) on a specific DTS or on all (global) DTSs such as DTSs 404, 406, 408, and 410 of FIG. 4. The direction bits of thermal sensor interrupt mask register are $B_G$ and $B_X$. The interrupt direction defines a condition that generates an interrupt. The interrupt can either be generated when the temperature changes from below the interrupt temperature to equal to or above the interrupt temperature, or when the temperature changes from above or equal to the interrupt temperature to below the interrupt temperature. The thermal management control state machine identifies the condition by the direction bits, $B_G$ and $B_X$, in the interrupt mask register. $B_G$ is the global direction bit. When $B_G$ is set to '0', the thermal management control state machine generates an interrupt when the temperature of any DTS is greater or equal to the global interrupt temperature. When $B_G$ is set to '1', the thermal management control state machine generates an interrupt when the temperature of all DTSs are below the global interrupt temperature. $B_X$ is the local direction bit, where X is the number of the individually associated DTSs. When $B_X$ is set to '0', the thermal management control state machine generates an interrupt when the temperature of the individual DTS is greater or equal to the DTS interrupt temperature. When $B_X$ is set to '1', the thermal management control state machine generates an interrupt when the temperature of the individual DTS is below the DTS interrupt temperature. The thermal interrupt status register (TS_ISR) records which sensor caused the advanced thermal interrupt. Software reads this register to determine which condition occurred and which sensor or sensors caused the interrupt. The thermal management control state machine resets the status bits in the thermal interrupt status register once read by software.

Therefore, the operation for advanced thermal interrupt generation may be shown from a global as well as a local view. FIG. 8A depicts the global advanced thermal interrupt generation and FIG. 8B depicts the local advanced thermal interrupt generation. As the operation begins in the global advanced thermal interrupt generation, FIG. 8A, the thermal management control state machine sets the global interrupt temperature T to temperature T1 and sets the global interrupt direction $B_G$ to '0' (step 802). The thermal management control state machine senses the temperature of the DTSs (step 804). The thermal management control state machine determines if any sensed temperature from the DTSs is greater than or equal to temperature T1 (step 806). If no sensed temperature is greater than or equal to temperature T1, then the operation returns to step 804. If at step 806 any one of the sensed temperatures is greater than or equal to temperature T1, then the thermal management control state machine generates an interrupt and sets the corresponding status bits in the thermal interrupt status register to record which sensors or sensors caused the interrupt (step 808). The operating system will then service the interrupt and may either slow down the workload on the processor or offload some of the workload of the processor to another processor in the system.

After the interrupt is generated, the thermal management control state machine sets the global interrupt temperature T to temperature T2 and the global interrupt direction $B_G$ is set to '1' (step 810). Temperature T2 should be set to less than or equal to temperature T1. The thermal management control state machine again senses the temperature of the DTSs (step 812). The thermal management control state machine determines if all the sensed temperatures from the DTSs are below temperature T2 (step 814). If no sensed temperature is below temperature T2, then the operation returns to step 812. If at step 814 all of the sensed temperatures are below temperature T2, then the thermal management control state machine generates an interrupt and sets the corresponding status bits in the thermal interrupt status register to record which sensors or sensors caused the interrupt (step 816). At this point, it is now safe for the operating system to resume normal operation. The operating system will then service the interrupt and restore the system to normal operation. Next, the operation returns to step 802, where the global interrupt temperature T is set to temperature T1 and the global interrupt direction $B_G$ is set to '0'.

An example of this operation would be, if all the DTSs have a global interrupt temperature of 80° C. and a global interrupt direction of '0'. Once any DTS of the associated units, such as the core of a processor or the processor itself, senses a temperature greater than or equal to 80° C., the thermal management control state machine generates an interrupt and sets the corresponding status bits in the thermal interrupt status register to record which sensors or sensors caused the interrupt. The operating system will then service the interrupt and may either slow down the workload on the processor or offload some of the workload of the processor to another processor in the system. Also, at this point the thermal management control state machine may reset the global interrupt temperature to an exemplary 77° C. and set the global interrupt direction to '1'. The workload will continue to operate in a slow mode or remain off the processor until the DTSs sense a temperature that is below 77° C. for all of the DTSs. Once the thermal management control state machine determines the sensed temperature to be below 77° C., the thermal management control state machine generates another interrupt. The thermal management control state machine sets the global interrupt temperature to 80° C., sets the global interrupt direction to '0', and then the operating system resumes normal operation of the workload.

Turning to FIG. 8B, the illustrative embodiment is limited to one DTS although the illustration is the same for each DTS. As the operation begins for the local advanced thermal interrupt generation, the thermal management control state machine sets the local interrupt temperature T to temperature T3 and sets the local interrupt direction $B_X$ to '0' (step 852). The thermal management control state machine senses the temperature of the DTS (step 854). The thermal management control state machine determines if the sensed temperature from the DTS is greater than or equal to temperature T3 (step 856). If the sensed temperature is not greater than or equal to temperature T3, then the operation returns to step 854. If the sensed temperature is greater than or equal to temperature T3, then the thermal management control state machine generates an interrupt and sets the corresponding status bits in the thermal interrupt status register to record which sensors or sensors caused the interrupt (step 858). The operating system will then service the interrupt and may either slow down the workload on the processor or offload some of the workload to other units within the processor or to another processor in the system.

After the thermal management control state machine generates the interrupt, the thermal management control state machine sets the local interrupt temperature T to temperature T4 and sets the local interrupt direction $B_X$ to '1' (step 860). Temperature T4 should be set to less than or equal to temperature T3. The thermal management control state machine again senses the temperature of the DTS (step 862). The thermal management control state machine determines if the sensed temperature from the DTS is below temperature T4 (step 864). If the sensed temperature is not below temperature T4, then the operation returns to step 862. If the sensed temperature is below temperature T4, then the thermal management control state machine generates an interrupt and sets the corresponding status bits in the thermal interrupt status register to record which sensors or sensors caused the interrupt (step 866). At this point, it is now safe for the operating system to resume normal operation. The operating system will then service the interrupt and restore the system to normal operation. Next, the operation returns to step 852 where the thermal management control state machine sets the local interrupt temperature T to temperature T3 and sets the local interrupt direction $B_X$ to '0'.

An example of this operation would be, if a given DTS has a local interrupt temperature of 80° C. and a local interrupt direction of '0'. Once the DTS of an associated unit senses a temperature greater than or equal to 80° C., the thermal management control state machine generates an interrupt, and sets the corresponding status bits in the thermal interrupt status register to record which sensors or sensors caused the interrupt. The operating system will then service the interrupt and may either slow down the workload on the processor or offload some of the workload of the processor to another processor in the system. Also, at this point the thermal management control state machine may reset the local interrupt temperature to an exemplary 77° C. and set the local interrupt direction to '1'. The workload will continue to operate in a slow mode or remain off the unit of processor experiencing the thermal condition or the processor until the DTS senses a temperature that is below 77° C. Once the thermal management control state machine determines the sensed temperature to be below 77° C., the thermal management control state machine generates another interrupt. The thermal management control state machine sets the local interrupt temperature to 80° C., sets the local interrupt direction to '0', and then the operating system resumes normal operation of the workload.

Thus, advanced thermal interrupt generation allows the operating system to program interrupt generation to follow the direction of temperature change and eliminates the need for an interrupt handler to continually poll the current temperature in the case of a thermal interrupt.

Figure 9:
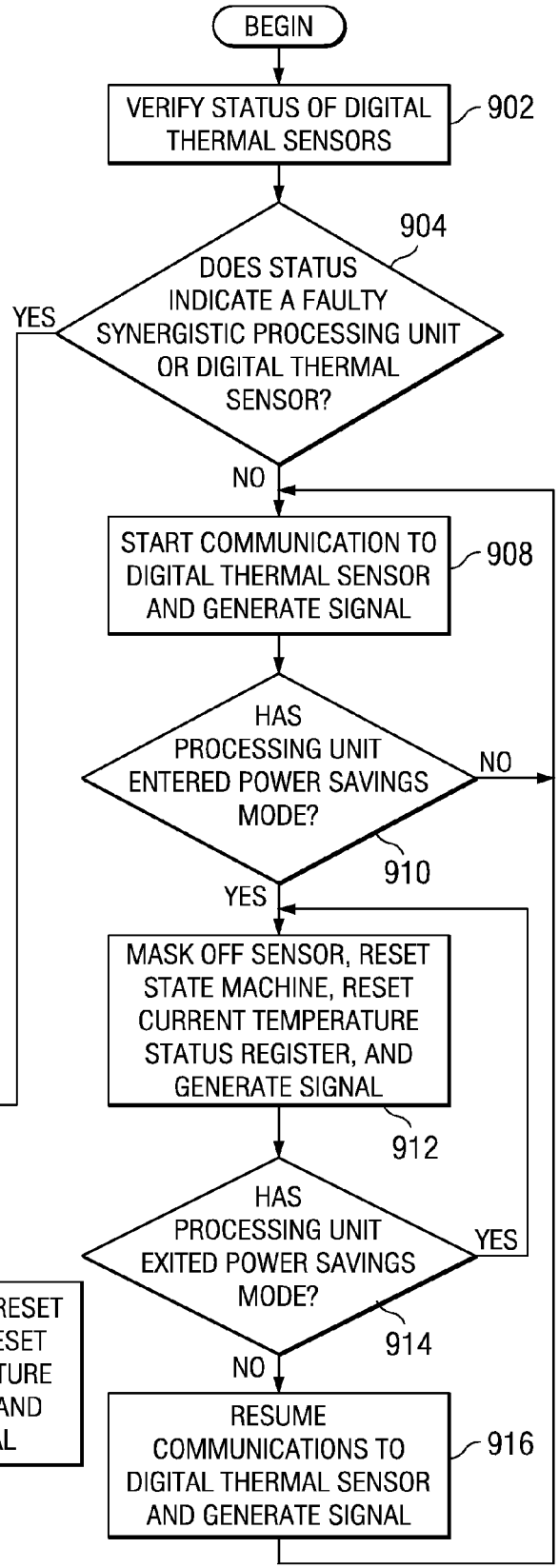
FIG. 9 depicts a flow diagram of the operation for support of deep power savings mode and partial good in a thermal management system in accordance with an additional illustrative embodiment.

FIG. 9 depicts a flow diagram of the operation for support of deep power savings mode and partial good in a thermal management system in accordance with an additional illustrative embodiment. As previously described, the Cell BE chip includes a thermal management system that is provided through pervasive logic unit 351 of FIG. 3. In the Cell BE chip 300 of FIG. 3, there exists a number of power saving modes. Depending on the implementation of each of the power saving modes, some may limit the accessibility of the DTSs, such as DTSs 404, 406, 408, and 410 of FIG. 4. For example, if a SPU, such as SPUs (SPU) 310, 311, and 312 of FIG. 3, is in a power saving mode where the clock is turned off, that is the deserializer, such as deserializer 462 of FIG. 4, is disabled, the path between the serializer, such as serializer 456 of FIG. 4, and the DTS, such as DTS 404 of FIG. 4, will not function. Another example of a power saving mode could be where the power supply is turned off. In this case, the actual DTS could be disabled. Another example is where the thermal management control state machine determines the sensor or a unit within the processor to be broken during manufacturing test. If the sensor or unit is redundant, manufacturing can mark the sensor or unit as faulty, creating a partial good processor that will still function with just a limited number of units or sensors. In either case, the thermal management control state machine, such as thermal management control state machine 458 of FIG. 4, needs to monitor the status of these power modes and mask off the non functional DTS(s) from participation in the thermal management tasks (e.g. throttling, interrupts, etc.).

Returning to FIG. 9, which depicts the flow diagram of the operation for support of deep power savings mode and partial good in a thermal sensing and thermal management system. As the operation begins, the thermal management control state machine uses data from the various DTSs to track the status of the DTSs (step 902). The thermal management control state machine stores the data in internal calibration storages, such as internal calibration storage 428 of FIG. 4. As discussed previously, operation of a particular DTS may be inhibited by a power savings mode, a faulty DTS, or SPU which is communicated to the thermal management control state machine via data flow, such as data flow 460 of FIG. 4. The effect of partial good condition reported by the manufacturing process is similar to power savings mode, except a partial good is a permanent condition and the DTS should be permanently masked off. In the case a SPU is marked faulty, the thermal management control state machine turns off the entire SPU, and disables the serializer. In case a DTS is marked faulty, the thermal management control state machine masks off the DTS. The thermal management control state machine determines whether the DTS or SPU is faulty or functional (step 904). If the DTS or SPU is faulty, the thermal management control state machine masks off the DTS (step 906), with the operating ending thereafter.

In order to mask off a DTS that is in a power management state, the thermal management control state machine resets the related current temperature status register of the current temperature status registers, such as current temperature status register 412 of FIG. 4 to 0x0, which is the lowest temperature setting. An alternative method might also be to allocate an encoding of the related current temperature status register, by setting a status bit, to indicate the DTS is masked, which may be more precise than to just reset the sensor reading. The thermal management control state machine then stops communications from the current temperature status register to and from the DTS. Stopping communications is an optional step mainly to save power and not perform useless overhead work. The thermal management control state machine then generates a signal to indicate the DTS is currently masked and should not participate in thermal management tasks. Finally, the thermal management control state machine resets the state of the DTS. When the unit, such as the core of a processor or the processor itself, related to the DTS exits power savings mode, the thermal management control state machine resumes communication to DTS, resumes updating of the current temperature status register, and sends a signal that the DTS may participate in thermal management tasks.

Returning to step 904, if the DTS and SPU are both functional, the thermal management control state machine starts communication to DTS (step 908). The thermal management control state machine monitors the power management states of the SPU to determine when the SPU enters a power savings mode (step 910). Until the SPU enters a power savings mode, the operation returns to step 908. If the SPU enters the power savings mode and the DTS is disabled, the thermal management control state machine masks off the DTS in a method as discussed above with relation to step 906 (step 912). Since the DTS is indicated as disabled and functional, the thermal management control state machine continues monitoring of the power management state of the SPU (step 914). Until the SPU exits the power savings mode, the operation returns to step 912. When the SPU exits power savings mode, and the DTS is no longer disabled, the thermal control state machine starts communication to DTS, resumes updating of the current temperature status register, and sends a signal that the DTS may participate in thermal management tasks (step 916), with the operation returning to step 908.

Thus, masking the temperature readings of DTSs that are partially good, faulty, or in a power savings mode isolates the none-working or disabled DTS from participating in the thermal management tasks.

Figure 10:
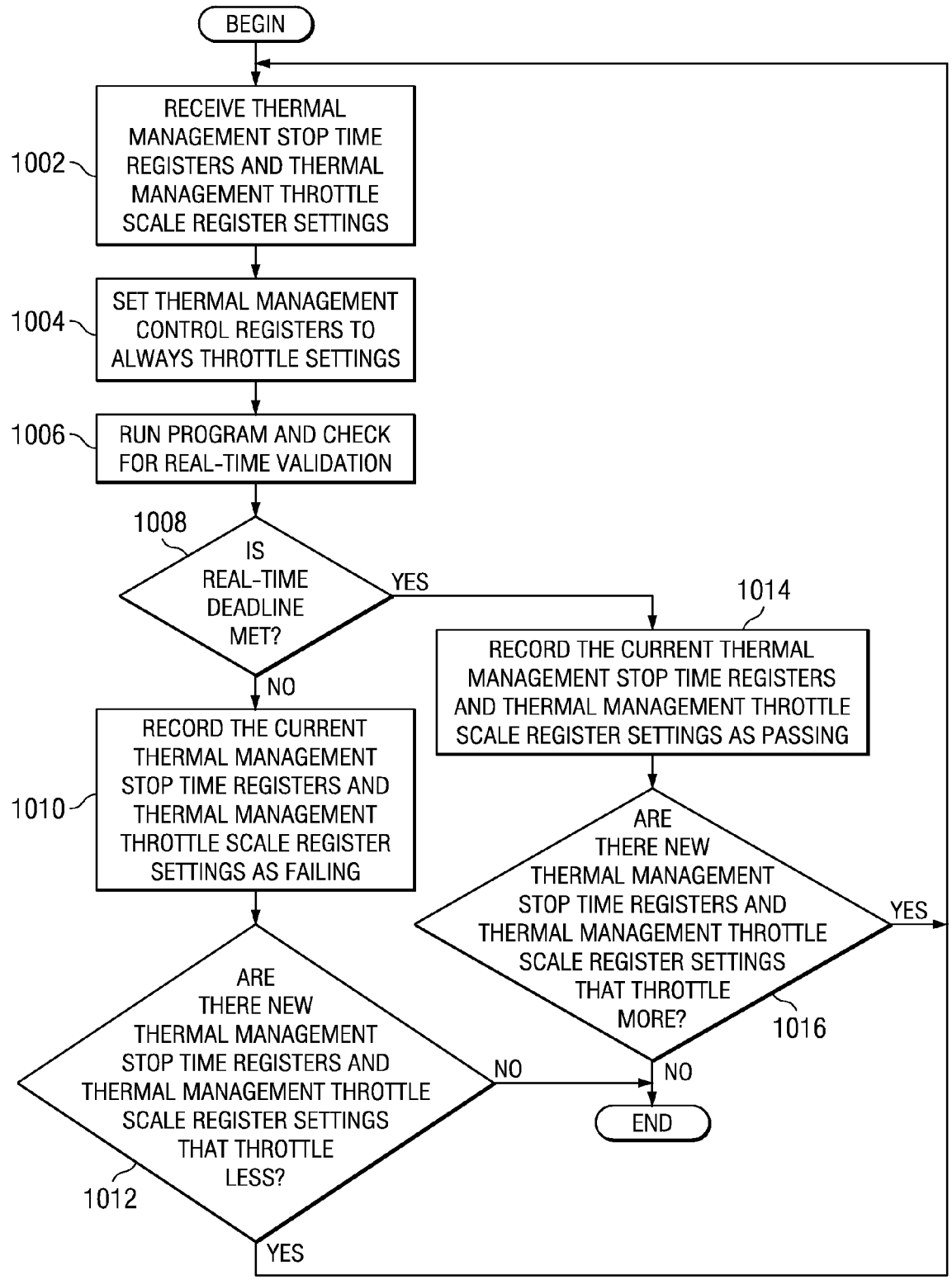
FIG. 10 depicts a flow diagram of the operation for a thermal throttle control feature which enables real-time testing of thermal aware software applications independent of temperature in accordance with an additional illustrative embodiment.

FIG. 10 depicts a flow diagram of the operation for a thermal throttle control feature which enables real-time testing of thermal aware software applications independent of temperature in accordance with an additional illustrative embodiment. As previously described, the Cell BE chip includes a thermal management system that is provided through pervasive logic unit 351 of FIG. 3. Thermal management control registers, such as thermal management control registers 430 of FIG. 4, provide access and configuration for various thermal throttle control features. Thermal throttle is designed to reduce temperature by cutting back performance in case of a thermal event using throttling.

Thermal management stop time registers, such as thermal management stop time registers 434 of FIG. 4, and thermal management throttle scale register, such as thermal management throttle scale register 436 of FIG. 4, together set the amount of throttling and the behavior of throttling. In a real-time system, real-time deadlines need to be guaranteed. It is important for a software developer and the quality assurance team to know and test the maximal amount of throttling, which is the maximal setting of the thermal management stop time registers and the thermal management throttle scale register a program or a code segment may tolerate and still guarantee real-time deadlines of the real-time system. Instead of adjusting the actual temperature of the hardware to cause a thermal event and, thus, trigger a throttling condition, the thermal management control state machine provides a mode that always provides throttling, regardless of the temperature. The thermal management control state machine sets this mode in a thermal management control register, which sets the chips into a constant throttle state. This feature aids the software developer to test and qualify their code to meet real-time standards.

As the operation begins, thermal management stop time registers and thermal management throttle scale register thermal control settings are received (step 1002). The thermal management control state machine uses the settings of the thermal management stop time registers and thermal management throttle scale register to determine how throttling will be performed. Then, the thermal management control state machine sets the test mode and sets the thermal management control registers to an always throttle setting (step 1004). Then the program runs for a real-time validation that the software or program will meet the real-time deadline under the thermal management stop time registers and thermal management throttle scale register thermal control settings (step 1006). The test mode may be any type of throttling mode, such as always throttle or randomly throttle. Then, the thermal management control state machine determines if the real-time deadline was met (step 1008). If the real-time deadline was not met, the thermal management control state machine records the current thermal management stop time registers and thermal management throttle scale register thermal control settings as failing (step 1010). The thermal management control state machine then determines whether there are any new thermal management stop time registers and thermal management throttle scale register thermal control settings that will decrease the amount of throttling (step 1012). If there are new thermal management stop time registers and thermal management throttle scale register thermal control settings, the operation returns to step 1002. If at step 1012 there are not any new thermal management stop time registers and thermal management throttle scale register thermal control settings, the operation ends.

Returning to step 1008, if the real-time deadline was met, the thermal management control state machine records the current thermal management stop time registers and thermal management throttle scale register thermal control settings as passing (step 1014). The thermal management control state machine determines whether there are any new thermal management stop time registers and thermal management throttle scale register thermal control settings that will increase the amount of throttling (step 1016). If there are new thermal management stop time registers and thermal management throttle scale register thermal control settings, the operation returns to step 1002. If at step 1016, there are not any new thermal management stop time registers and thermal management throttle scale register thermal control settings, the operation ends.

Thus, providing a mode of operation that always throttles aids software developers to test and qualify that their code meet real-time deadlines under the worst case thermal conditions. The software developer and the quality assurance team can also use this feature to determine the maximal amount of throttling a program or a code segment may tolerate and still be guaranteed to meet the real-time deadlines of the real-time system. Once the thermal management control state machine determines and validates the maximal amount of throttling, software can set an interrupt to occur on the condition where full throttling occurs. If the thermal management control state machine ever generates this interrupt, the thermal management control state machine notifies the application that a potential exist for the real-time guarantee to be violated or not met.

In addition to the always throttle control setting, it is also possible for an implementation to provide a mode which would inject random thermal events or directed random thermal events to simulate more realistic interactions of throttling and the execution of software. This technique is similar to randomly injecting errors on a bus to test error recovery code.

Figure 11:
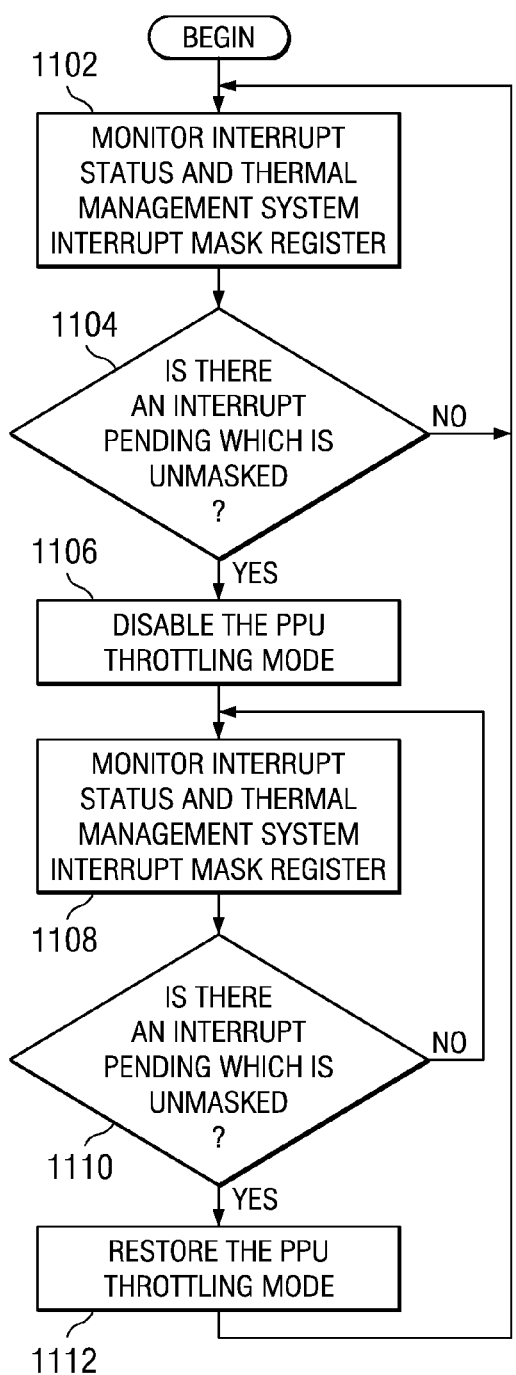
FIG. 11 depicts a flow diagram of the operation for an implementation of thermal throttle control with minimal impact to interrupt latency in accordance with an additional illustrative embodiment.

FIG. 11 depicts a flow diagram of the operation for an implementation of thermal throttle control with minimal impact to interrupt latency in accordance with an additional illustrative embodiment. As previously described, the Cell BE chip includes a thermal management system that is provided through pervasive logic unit 351 of FIG. 3. When any part of a computer system is placed in a throttling condition, the throttling condition reduces performance of the entire system. The reduction of performance increases the latency of an interrupt, in terms of how soon an interrupt can be serviced as well as how long it will take to service the interrupt. The increase of interrupt latency has serious implication to the system as a whole, and therefore a desirability and necessity exists to minimize the impact of thermal throttling to interrupt latency. Minimizing the impact of thermal throttling due to interrupt latency is a feature directed to a PPU throttle control, such as by PPU 308 of FIG. 3. SPUs, such as SPUs 310, 311, and 312 of FIG. 3, do not take interrupts and therefore are not affected by this feature.

As the operation begins, the thermal management controls state machine, such as thermal management control state machine 458 of FIG. 4, monitors all PPU interrupt status bits and the thermal management system interrupt mask register, such as thermal management system interrupt mask register 438 of FIG. 4 (step 1102). The thermal management system interrupt mask register controls masking of an interrupt. The thermal management control state machine determines if there are any interrupts pending which are unmasked (step 1104). If there are no interrupts pending or there are interrupts pending but are masked, the operation returns to step 1102.

If at step 1104 there are interrupts pending that are unmasked, the thermal management control state machine temporarily disables any throttle mode regardless of a partial throttle or full throttle state (step 1106). Disabling the throttle mode allows the PPU to temporarily operate at full performance and handle any pending interrupts without any delay induced by the effects of thermal throttling. Again, the thermal management control state machine monitors all PPU interrupt statuses and the thermal management system interrupt mask register (step 1108). The thermal management control state machine determines if there are any interrupts pending which are not masked (step 1110). If there are no interrupts pending or there are interrupts pending but are masked, the operation returns to step 1108. When at step 1110 the interrupt status clears, the thermal management control state machine restores the PPU to the original throttle mode (step 1112) and the operation returns to step 1102.

The interrupt handler has the choice to clear the interrupt status bit at the beginning of the interrupt handler routine, or at the end of the routine. The interrupt handler may be located in the power processor element, such as power processor element 301 of FIG. 3, or software executed by the power processor element. If the interrupt handler chooses to clear the interrupt status bit at the beginning and also like to avoid any performance degradation of PPU, the interrupt handler may disable the thermal throttling before clearing the interrupt status bit. That is, the interrupt does not cause a change in the control register. Therefore, throttling is still enabled, but suspended by the thermal management control unit, such as TMCU 402 of FIG. 4, when an unmasked interrupt is present. If the interrupt handler should reset the interrupt status prior to handling the interrupt, the handler should set the control register to disable throttling (or reduce the amount of throttling to an acceptable level), reset the interrupt, service the interrupt, and then re-enable throttling or set the amount of throttling back to the previous level. An exemplary disablement of thermal throttling may be performed by setting the thermal management control registers, such as thermal management control registers 430 of FIG. 4, to 0XX, where X is does not care. At the end of the interrupt routine, interrupt handler should set thermal management control registers back to its original value. If interrupt handler clears the interrupt status bit at the end of the interrupt routine, no additional work is required and the thermal management control state machine will keep the PPU out of throttle mode as long as interrupt status bit is active.

Figure 12:
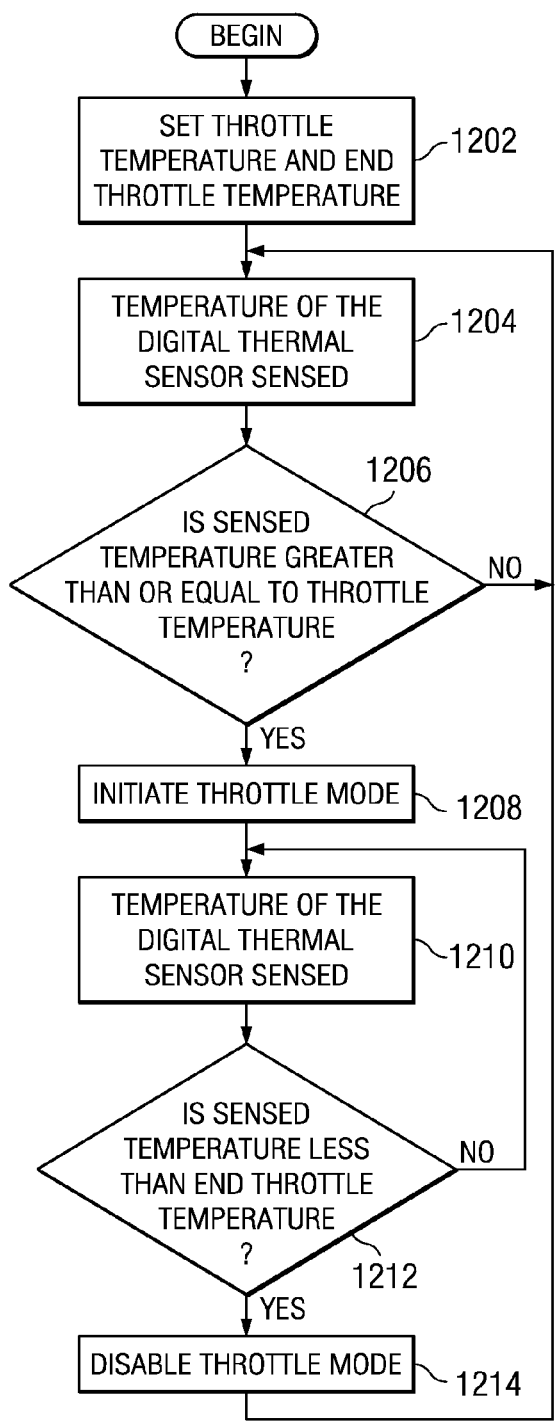
FIG. 12 depicts a flow diagram of the operation for hysteresis in thermal throttling in accordance with an additional illustrative embodiment.

FIG. 12 depicts a flow diagram of the operation for hysteresis in thermal throttling in accordance with an additional illustrative embodiment. As previously described, the Cell BE chip includes a thermal management system that is provided through pervasive logic unit 351 of FIG. 3. Hysteresis in thermal throttling is the lag between making a change, such as throttling and ending throttling, and the response or effect of that change. For example, if the throttling point is set to 75° C. and the end throttling point is set to 72° C., the hysteresis ranges from 75° C. to 72° C. FIG. 5 depicts a thermal throttling hysteresis.

A thermal management throttle point register, such as thermal management throttle point register 432 of FIG. 4, provides two temperature settings: throttle temperature and end throttle temperature. The throttle temperature should be set to higher than the end throttle temperature. The temperature difference defines the amount of hysteresis between the throttle temperature and end throttle temperature, thus providing a programmable amount of hysteresis.

Illustratively limiting the following discussion to one DTS, as the operation of hysteresis thermal throttling begins, the thermal management control state machine sets the throttle temperature and end throttle temperature in the thermal management throttle point register (step 1202). The thermal management control state machine senses the temperature of the DTS (step 1204). The thermal management control state machine determines whether the sensed temperature from the DTS is greater than or equal to the throttling temperature (step 1206). If the sensed temperature is not greater than or equal to the throttling temperature, the operation returns to step 1204. If at step 1206 the sensed temperature is greater than or equal to the throttling temperature, the thermal management control state machine initiates the throttling mode (step 1208).

Again, the thermal management control state machine senses the temperature of the DTS (step 1210). The thermal management control state machine determines whether the sensed temperature from the DTS is greater than or equal to the throttling temperature (step 1212). If the sensed temperature is not less than the end throttling temperature, the operation returns to step 1210. If at step 1212 the DTS is less than the end throttling temperature, the thermal management control state machine disables the throttling mode (step 1214), with the operation returning to step 1204.

Thus, when temperature rises to equal or above the throttle temperature, the thermal management control state machine puts the unit into throttle mode, assuming the thermal management control registers are properly configured to allow throttle mode. The thermal management control state machine keeps the unit in throttle mode until temperature falls below end throttle temperature. If the end throttle temperature is less than throttle temperature, the identified hysteresis allows the unit to cool off sufficiently before disabling the throttle mode. Without the hysteresis, a unit could be in and out of the throttle mode very frequently and reduce the overall efficiency of throttling and the efficiency of the processor.

An exemplary method of throttling of a processor may be accomplished by blocking the dispatch of instructions. If throttling is enabled and disabled very frequently, then the pipeline of the processor may be flushed very often, thus, reducing the processing capability. Another exemplary method of throttling of a processor may be accomplished by slowing down the clock frequency.

FIG. 13 depicts a flow diagram of the operation of an implementation of thermal throttling logic in accordance with an additional illustrative embodiment. FIG. 13 represents a complete thermal management solution as described in the above Figures. As previously described, the Cell BE chip includes a thermal management system that is provided through pervasive logic unit 351 of FIG. 3. The TMCU such as TMCU 402 of FIG. 4 includes a number of dynamic thermal management registers. The dynamic thermal management registers are thermal management control registers, thermal management throttle point register, thermal management stop time registers, thermal management throttle scale register, and thermal management system interrupt mask register, such thermal management control registers 430 (TM_CR1 and TM_CR2), thermal management throttle point register 432 (TM_TPR), thermal management stop time registers 434 (TM_STR1 and TM_STR2), thermal management throttle scale register 436 (TM_TSR), and thermal management system interrupt mask register 438 (TM_SIMR) of FIG. 4.

Thermal management throttle point register sets the throttle point for the DTSs. Two independent throttle points may be set in thermal management throttle point register, one for the PPE and one for the SPEs. Also contained in this register are temperature points for enabling throttling and disabling throttling or stopping the PPE or SPEs. Execution throttling of a PPE or a SPE starts when the temperature is equal to or above the throttle point. Throttling ceases when the temperature drops below the temperature to disable throttling. If the temperature reaches the full throttle or stop temperature, the execution of the PPE or SPE is stopped.

The thermal management control state machine uses thermal management stop time registers and thermal management throttle scale register to control the frequency and amount of throttling. When the temperature reaches the throttle point, the thermal management control state machine stops the corresponding PPE or SPE for the number of clocks specified by the corresponding scale value in thermal management throttle scale register. Then the thermal management control state machine allows the PPE or SPE to run for the number of clocks specified by the run value in thermal management stop time registers times the corresponding scale value. This sequence continues until the temperature falls below the disable throttling.

The thermal management control state machine uses thermal management system interrupt mask register to select which interrupts disable throttling of the PPE while the interrupt is pending.

Thermal management control registers set the throttling mode for each PPE or SPE independently. Following are the five different modes that may be set for each PPE or SPE independently:
Dynamic throttling disabled (including the core stop safety).
Normal operation (dynamic throttling and the core stop safety are enabled).
PPE or SPE is always throttled (core stop safety is enabled).
Core stop safety disabled (dynamic throttling enabled and the core stop safety are disabled).
PPE or SPE is always throttled and core stop safety disabled.

As the operation for implementing thermal throttling logic, the thermal management control state machine sets the throttle temperature and end throttle temperature in the thermal management throttle point register (step 1302). The thermal management control state machine senses the temperature of the DTS (step 1304). The thermal management control state machine determines whether the sensed temperature from the DTS is greater than or equal to the throttling temperature (step 1306). If the sensed temperature is not greater than or equal to the throttling temperature, the operation returns to step 1304. If the sensed temperature is greater than or equal to the throttling temperature, the thermal management control state machine initiates the throttling mode (step 1308).

Then, the thermal management control state machine controls the throttling by the type of throttling as indicated by the values indicated in the thermal management control registers (step 1310). Once the type of throttling is indicated, the thermal management control state machine then limits the throttling by the amount of throttling indicated in the thermal management stop time registers (step 1312). The stop time registers sets a ratio between how long the processor will be stopped and how long the processor will be allowed to run or the percentage of throttling. Finally, the thermal management control state machine scales the duration of the stop and run times by the value specified in the thermal management scale register (step 1314). At this point the operation splits for concurrent operations, steps 1316 and 1322. At step 1316, the thermal management control state machine senses the temperature of the DTS. The thermal management control state machine determines whether the sensed temperature from the DTS is greater than or equal to the throttling temperature (step 1318). If the sensed temperature is not less than the end throttling temperature, the operation returns to step 1316. If the DTS is less than the end throttling temperature, the thermal management control state machine disables the throttling mode (step 1320), with the operation returning to step 1304.

Returning to step 1314, after the final throttling limitation is implemented, the thermal management control state machine concurrently monitors all PPU interrupt status for any interrupts that are pending (step 1322). If an interrupt is encountered while throttling is implemented, the thermal management control state machine temporarily disables any throttle mode until the interrupt has been handled, whereupon, the throttling is enabled regardless of a partial throttle or full throttle state and the operation returns to step 1308. An in-depth discussion of monitoring for an interrupt status is discussed with regard to FIG. 11.

Thus, the thermal interrupt logic of the thermal management system included with the Cell BE chip provides a dynamic means for managing the thermal conditions of the Cell BE chip and protecting the Cell BE chip and its components.

The illustrative embodiments can take the form of an entirely hardware embodiment, an entirely software embodiment or an embodiment containing both hardware and software elements. The illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer implemented method for thermal interrupt generation in an integrated circuit, comprising:
    setting an interrupt temperature to a first temperature; setting an interrupt direction to a greater than or equal to determination;
    responsive to the interrupt direction, determining if a sensed temperature from a digital thermal sensor meets or exceeds the interrupt temperature;
    responsive to the sensed temperature meeting or exceeding the interrupt temperature, generating a first interrupt; and
    setting a performance monitor to a tracing mode, wherein the performance monitor is located on the integrated circuit, and wherein the performance monitor traces thermal data provided by a plurality of digital thermal sensors into a memory.

2. The method of claim 1, further comprising:
    responsive to the generation of the first interrupt, setting the interrupt temperature to a second temperature to form a new interrupt temperature;
    responsive to the generation of the first interrupt, setting the interrupt direction to a less than determination to form a new interrupt direction;
    responsive to the new interrupt direction, determining if the sensed temperature from the digital thermal sensor is less than the new interrupt temperature; and
    responsive to the sensed temperature being less than the new interrupt temperature, generating a second interrupt.

3. The method of claim 2, wherein the second interrupt returns the workload to a level that existed prior to the first interrupt, resets the new interrupt temperature to the first temperature, and resets the new interrupt direction to a greater than or equal to determination.

4. The method of claim 2, wherein the first temperature and the second temperature are selectable and user-programmable.

5. The method of claim 1, wherein the setting, determining, and generating steps are performed by a thermal management control state machine residing within the integrated circuit.

6. The method of claim 1, wherein the first interrupt is handled by a software interrupt handler and wherein the software interrupt handler performs at least one of slowing down the workload being executed on a processing unit associated with the digital thermal sensor or offloading the workload being sent to the processing unit associated with the digital thermal sensor.

7. The method of claim 1, wherein the integrated circuit is a heterogeneous multi-core processor.

8. The method of claim 1, wherein the digital thermal sensor is a plurality digital thermal sensors that further comprises:
    determining if any digital thermal sensor from the two or more sensors is greater than or equal to the interrupt temperature; and
    responsive to any sensed temperature meeting or exceeding the interrupt temperature, generating the first interrupt.

9. The method of claim 8, further comprising:
    responsive to the generation of the first interrupt, setting the interrupt temperature to a second temperature to form a new interrupt temperature;
    responsive to the generation of the first interrupt, setting the interrupt direction to a less than determination to form a new interrupt direction;
    determining if all sensed temperatures from the plurality of digital thermal sensors are less than the new interrupt temperature; and
    responsive to the sensed temperature being less than the new interrupt temperature, generating a second interrupt.

10. The method of claim 8, wherein the first interrupt is handled by a software interrupt handler and wherein the software interrupt handler performs at least one of slowing down the workload being sent to all units of a plurality of processing units associated with the two or more digital thermal sensors or offloading the workload being sent to all units of the plurality of processing units associated with the two or more digital thermal sensors.

11. The method of claim 9, wherein the second interrupt returns the workload to a level that existed prior to the first interrupt, resets the new interrupt temperature to the first temperature, and resets the new interrupt direction to a greater than or equal to determination.

12. A data processing system comprising:
a bus;
a memory coupled to the bus, wherein the memory includes a set of instructions; and
a integrated circuit coupled to the bus, wherein the integrated circuit executes the set of instructions to:
set an interrupt temperature to a first temperature;
set an interrupt direction to a greater than or equal to determination;
determine if a sensed temperature from a digital thermal sensor meets or exceeds the interrupt temperature in response to the interrupt direction;
generate a first interrupt responsive to the sensed temperature meeting or exceeding the interrupt temperature; and
set a performance monitor to a tracing mode, wherein the performance monitor is located on the integrated circuit, and wherein the performance monitor traces thermal data provided by a plurality of digital thermal sensors into a memory.

13. The system of claim 12, wherein the integrated circuit executes the set of instructions to
set the interrupt temperature to a second temperature to form a new interrupt temperature in response to the generation of the first interrupt;
set the interrupt direction to a less than determination to form a new interrupt direction in response to the generation of the first interrupt;
determine if the sensed temperature from the digital thermal sensor is less than the new interrupt temperature in response to the new interrupt direction; and
generate a second interrupt in response to the sensed temperature being less than the new interrupt temperature.

14. The system of claim 12, wherein the set of instructions to set, determine, and generate are performed by a thermal management control state machine residing within the integrated circuit.

15. The system of claim 12, wherein the digital thermal sensor is a plurality digital thermal sensors and wherein the integrated circuit further executes the set of instructions to
determine if any digital thermal sensor from the two or more sensors is greater than or equal to the interrupt temperature; and
generate the first interrupt in response to any sensed temperature meeting or exceeding the interrupt temperature.

16. The system of claim 15, wherein the integrated circuit executes the set of instructions to
set the interrupt temperature to a second temperature to form a new interrupt temperature in response to the generation of the first interrupt;
set the interrupt direction to a less than determination to form a new interrupt direction in response to the generation of the first interrupt;
determine if all sensed temperatures from the plurality of digital thermal sensors are less than the new interrupt temperature; and generating a second interrupt in response to the sensed temperature being less than the new interrupt temperature.

17. A processor, comprising:
at least one processing core;
a thermal management control state machine; and
a digital thermal sensor, wherein the processor executes the set of instructions to:
set an interrupt temperature, using the state machine, to a first temperature;
set an interrupt direction, using the state machine, to a greater than or equal to determination;
determine, using the state machine, if a sensed temperature from a digital thermal sensor meets or exceeds the interrupt temperature in response to the interrupt direction;
generate, using the state machine, a first interrupt responsive to the sensed temperature meeting or exceeding the interrupt temperature; and
set a performance monitor to a tracing mode, wherein the performance monitor is located on the integrated circuit, and wherein the performance monitor traces thermal data provided by a plurality of digital thermal sensors into a memory.

18. The processor of claim 17, wherein the processor executes the set of instructions to
set, using the state machine, the interrupt temperature to a second temperature to form a new interrupt temperature in response to the generation of the first interrupt;
set, using the state machine, the interrupt direction to a less than determination to form a new interrupt direction in response to the generation of the first interrupt;
determine, using the state machine, if the sensed temperature from the digital thermal sensor is less than the new interrupt temperature in response to the new interrupt direction; and
generate, using the state machine, a second interrupt in response to the sensed temperature being less than the new interrupt temperature.

19. The processor of claim 17, wherein the digital thermal sensor is a plurality digital thermal sensors and wherein the processor executes the set of instructions to
determine, using the state machine, if any digital thermal sensor from the two or more sensors is greater than or equal to the interrupt temperature; and
generate, using the state machine, the first interrupt in response to any sensed temperature meeting or exceeding the interrupt temperature.

20. The processor of claim 19, wherein the processor executes the set of instructions to
set, using the state machine, the interrupt temperature to a second temperature to form a new interrupt temperature in response to the generation of the first interrupt;
set, using the state machine, the interrupt direction to a less than determination to form a new interrupt direction in response to the generation of the first interrupt;
determine, using the state machine, if all sensed temperatures from the plurality of digital thermal sensors are less than the new interrupt temperature; and
generate, using the state machine, a second interrupt in response to the sensed temperature being less than the new interrupt temperature.

* * * * *